(12) United States Patent
Peskin et al.

(10) Patent No.: US 9,678,520 B2
(45) Date of Patent: *Jun. 13, 2017

(54) ELECTRIC POWER SYSTEM CONTROL WITH PLANNING OF ENERGY DEMAND AND ENERGY EFFICIENCY USING AMI-BASED DATA ANALYSIS

(71) Applicant: Dominion Resources, Inc., Richmond, VA (US)

(72) Inventors: Melissa A. Peskin, Richmond, VA (US); Phillip W. Powell, Chesterfield County, VA (US)

(73) Assignee: Dominion Resources, Inc., Richmond, VA (US)

( * ) Notice: Subject to any disclaimer, the term of this patent is extended or adjusted under 35 U.S.C. 154(b) by 522 days.

This patent is subject to a terminal disclaimer.

(21) Appl. No.: 14/193,872

(22) Filed: Feb. 28, 2014

(65) Prior Publication Data

US 2014/0277796 A1    Sep. 18, 2014

Related U.S. Application Data

(60) Provisional application No. 61/794,623, filed on Mar. 15, 2013.

(51) Int. Cl.
  *G05D 9/00*    (2006.01)
  *G05F 1/10*    (2006.01)
  (Continued)

(52) U.S. Cl.
  CPC ............... *G05F 1/10* (2013.01); *G05B 13/04* (2013.01); *G05B 15/02* (2013.01); *G06Q 10/06* (2013.01);
  (Continued)

(58) Field of Classification Search
  CPC ........................................................ G05F 1/10
  See application file for complete search history.

(56) References Cited

U.S. PATENT DOCUMENTS 3,900,842 A    8/1975 Calabro et al.
3,970,898 A    7/1976 Baumann et al.
(Continued)

FOREIGN PATENT DOCUMENTS

EA           9685       2/2008
EP     0020310 A1    12/1980
(Continued)

OTHER PUBLICATIONS

American National Standard for Electric Power Systems and Equipment Voltage Ratings (60 Hertz); National Electrical Manufactures Association, Approved Dec. 6, 2006, American National Standards Institute, Inc., pp. 1-23.

(Continued)

*Primary Examiner* — Philip Wang
(74) *Attorney, Agent, or Firm* — Blank Rome LLP

(57) ABSTRACT

A method, apparatus, system and computer program is provided for controlling an electric power system, including implementation of an energy planning process (EPP) system which can be used to plan a voltage control and conservation (VCC) system applied to an electrical distribution connection system (EEDCS). The EPP system plans modifications to the EEDCS as a result of operating the VCC system in the "ON" state, in order to maximize the level of energy conservation achieved by the VCC system control of the EEDCS. The EPP system may also identify potential problems in the EEDCS for correction.

42 Claims, 15 Drawing Sheets

(51) Int. Cl.
  *G05B 13/04* (2006.01)
  *G06Q 50/06* (2012.01)
  *H02J 3/12* (2006.01)
  *H02J 13/00* (2006.01)
  *G05B 15/02* (2006.01)
  *G06Q 10/06* (2012.01)
  *H02J 3/00* (2006.01)

(52) U.S. Cl.
  CPC ............... *G06Q 50/06* (2013.01); *H02J 3/12* (2013.01); *H02J 13/0006* (2013.01); *H02J 2003/007* (2013.01); *Y02E 40/76* (2013.01); *Y02E 60/76* (2013.01); *Y04S 10/54* (2013.01); *Y04S 10/545* (2013.01); *Y04S 40/22* (2013.01)

(56) References Cited

U.S. PATENT DOCUMENTS

| | | |
|---|---|---|
| 4,054,830 A | 10/1977 | Harrel |
| 4,234,904 A | 11/1980 | Fahlesson |
| 4,291,377 A | 9/1981 | Schneider et al. |
| 4,302,750 A | 11/1981 | Wadhwani et al. |
| 4,307,380 A | 12/1981 | Gander |
| 4,309,655 A | 1/1982 | Lienhard et al. |
| 4,310,829 A | 1/1982 | Rey |
| 4,356,553 A | 10/1982 | Steinle et al. |
| 4,361,872 A | 11/1982 | Spalti |
| 4,365,302 A | 12/1982 | Elms |
| 4,434,400 A | 2/1984 | Halder |
| 4,513,273 A | 4/1985 | Friedl |
| 4,525,668 A | 6/1985 | Lienhard et al. |
| 4,540,931 A | 9/1985 | Hahn |
| 4,630,220 A | 12/1986 | Peckinpaugh |
| 4,686,630 A | 8/1987 | Marsland et al. |
| 4,689,752 A | 8/1987 | Fernandes et al. |
| 4,695,737 A | 9/1987 | Rabon et al. |
| 4,791,520 A | 12/1988 | Stegmuller |
| 4,843,310 A | 6/1989 | Friedl |
| 4,853,620 A | 8/1989 | Halder et al. |
| 4,881,027 A | 11/1989 | Joder et al. |
| 4,887,028 A | 12/1989 | Voisine et al. |
| 4,894,610 A | 1/1990 | Friedl |
| 4,896,106 A | 1/1990 | Voisine et al. |
| 5,028,862 A | 7/1991 | Roth |
| 5,032,785 A | 7/1991 | Mathis et al. |
| 5,055,766 A | 10/1991 | McDermott et al. |
| 5,066,906 A | 11/1991 | Moore |
| 5,124,624 A | 6/1992 | De Vries et al. |
| 5,128,855 A | 7/1992 | Hilber et al. |
| 5,136,233 A | 8/1992 | Klinkenberg et al. |
| 5,231,347 A | 7/1993 | Voisine et al. |
| 5,249,150 A | 9/1993 | Gruber et al. |
| 5,262,715 A | 11/1993 | King et al. |
| 5,270,639 A | 12/1993 | Moore |
| 5,272,462 A | 12/1993 | Teyssandier et al. |
| 5,298,857 A | 3/1994 | Voisine et al. |
| 5,343,143 A | 8/1994 | Voisine et al. |
| 5,422,561 A | 6/1995 | Williams et al. |
| 5,432,507 A | 7/1995 | Mussino et al. |
| 5,466,973 A | 11/1995 | Griffoen |
| 5,475,867 A | 12/1995 | Blum |
| 5,511,108 A | 4/1996 | Severt et al. |
| 5,552,696 A | 9/1996 | Trainor et al. |
| 5,602,750 A | 2/1997 | Severt et al. |
| 5,604,414 A | 2/1997 | Milligan et al. |
| 5,610,394 A | 3/1997 | Lee et al. |
| 5,627,759 A | 5/1997 | Bearden et al. |
| 5,646,512 A | 7/1997 | Beckwith |
| 5,673,252 A | 9/1997 | Johnson et al. |
| 5,736,848 A | 4/1998 | De Vries et al. |
| 5,903,548 A | 5/1999 | Delamater |
| 5,918,380 A | 7/1999 | Schleich et al. |
| 5,963,146 A | 10/1999 | Johnson et al. |
| 6,006,212 A | 12/1999 | Schleich et al. |
| 6,026,355 A | 2/2000 | Rahman et al. |
| 6,172,616 B1 | 1/2001 | Johnson et al. |
| 6,218,995 B1 | 4/2001 | Higgins et al. |
| 6,219,655 B1 | 4/2001 | Schleich et al. |
| 6,333,975 B1 | 12/2001 | Brunn et al. |
| 6,373,236 B1 | 4/2002 | Lemay, Jr. et al. |
| 6,373,399 B1 | 4/2002 | Johnson et al. |
| 6,417,729 B1 | 7/2002 | Lemay et al. |
| 6,555,997 B1 | 4/2003 | De Vries et al. |
| 6,590,376 B1 | 7/2003 | Bammert et al. |
| 6,618,684 B1 | 9/2003 | Beroset et al. |
| 6,628,207 B1 | 9/2003 | Hemminger et al. |
| 6,633,823 B2 | 10/2003 | Bartone et al. |
| 6,636,893 B1 | 10/2003 | Fong |
| 6,650,249 B2 | 11/2003 | Meyer et al. |
| 6,653,945 B2 | 11/2003 | Johnson et al. |
| 6,667,692 B2 | 12/2003 | Griffin |
| 6,684,245 B1 | 1/2004 | Shuey et al. |
| 6,700,902 B1 | 3/2004 | Meyer |
| 6,703,823 B1 | 3/2004 | Hemminger et al. |
| 6,738,693 B2 | 5/2004 | Anderson |
| 6,747,446 B1 | 6/2004 | Voisine |
| 6,747,981 B2 | 6/2004 | Ardalan et al. |
| 6,756,914 B1 | 6/2004 | Fitzgerald et al. |
| 6,757,628 B1 | 6/2004 | Anderson et al. |
| 6,762,598 B1 | 7/2004 | Hemminger et al. |
| 6,773,652 B2 | 8/2004 | Loy et al. |
| 6,778,099 B1 | 8/2004 | Meyer et al. |
| 6,798,353 B2 | 9/2004 | Seal et al. |
| 6,815,942 B2 | 11/2004 | Randall et al. |
| 6,816,538 B2 | 11/2004 | Shuey et al. |
| 6,832,135 B2 | 12/2004 | Ying |
| 6,832,169 B2 | 12/2004 | Wakida et al. |
| 6,838,867 B2 | 1/2005 | Loy |
| 6,847,201 B2 | 1/2005 | De Vries et al. |
| 6,859,186 B2 | 2/2005 | Lizalek et al. |
| 6,859,742 B2 | 2/2005 | Randall et al. |
| 6,867,707 B1 | 3/2005 | Kelley et al. |
| 6,868,293 B1 | 3/2005 | Schurr et al. |
| 6,873,144 B2 | 3/2005 | Slater et al. |
| 6,882,137 B1 | 4/2005 | Voisine |
| 6,885,185 B1 | 4/2005 | Makinson et al. |
| 6,888,876 B1 | 5/2005 | Mason et al. |
| 6,892,144 B2 | 5/2005 | Slater et al. |
| 6,900,737 B1 | 5/2005 | Ardalan et al. |
| 6,906,507 B2 | 6/2005 | Briese et al. |
| 6,906,637 B2 | 6/2005 | Martin |
| 6,940,268 B2 | 9/2005 | Hemminger et al. |
| 6,940,711 B2 | 9/2005 | Heuell et al. |
| 6,947,854 B2 | 9/2005 | Swarztrauber et al. |
| 6,954,061 B2 | 10/2005 | Hemminger et al. |
| 6,982,390 B2 | 1/2006 | Heuell et al. |
| 6,988,043 B1 | 1/2006 | Randall |
| 6,989,667 B2 | 1/2006 | Loy |
| 6,995,685 B2 | 2/2006 | Randall |
| 7,005,844 B2 | 2/2006 | De Vries et al. |
| 7,009,379 B2 | 3/2006 | Ramirez |
| 7,020,178 B2 | 3/2006 | Mason et al. |
| 7,043,381 B2 | 5/2006 | Wakida et al. |
| 7,046,682 B2 | 5/2006 | Carpenter et al. |
| 7,064,679 B2 | 6/2006 | Ehrke et al. |
| 7,069,117 B2 | 6/2006 | Wilson et al. |
| 7,075,288 B2 | 7/2006 | Martin et al. |
| 7,079,962 B2 | 7/2006 | Cornwall et al. |
| 7,084,783 B1 | 8/2006 | Melvin et al. |
| 7,089,125 B2 | 8/2006 | Sonderegger |
| 7,091,878 B2 | 8/2006 | Holle et al. |
| 7,109,882 B2 | 9/2006 | Angelis |
| 7,112,949 B2 | 9/2006 | Voisine |
| 7,116,243 B2 | 10/2006 | Schleich et al. |
| 7,119,698 B2 | 10/2006 | Schleich et al. |
| 7,119,713 B2 | 10/2006 | Shuey et al. |
| 7,126,493 B2 | 10/2006 | Junker |
| 7,126,494 B2 | 10/2006 | Ardalan et al. |
| 7,135,850 B2 | 11/2006 | Ramirez |
| 7,142,106 B2 | 11/2006 | Scoggins |
| 7,145,474 B2 | 12/2006 | Shuey et al. |
| 7,149,605 B2 | 12/2006 | Chassin et al. |
| 7,154,938 B2 | 12/2006 | Cumeralto et al. |
| 7,161,455 B2 | 1/2007 | Tate et al. |

(56) References Cited

U.S. PATENT DOCUMENTS

| | | |
|---|---|---|
| 7,167,804 B2 | 1/2007 | Fridholm et al. |
| 7,168,972 B1 | 1/2007 | Autry et al. |
| 7,170,425 B2 | 1/2007 | Christopher et al. |
| 7,176,807 B2 | 2/2007 | Scoggins et al. |
| 7,180,282 B2 | 2/2007 | Schleifer |
| 7,187,906 B2 | 3/2007 | Mason et al. |
| 7,196,673 B2 | 3/2007 | Savage et al. |
| 7,209,049 B2 | 4/2007 | Dusenberry et al. |
| 7,218,998 B1 | 5/2007 | Neale |
| 7,224,158 B2 | 5/2007 | Petr |
| 7,227,350 B2 | 6/2007 | Shuey |
| 7,230,972 B2 | 6/2007 | Cornwall et al. |
| 7,236,498 B1 | 6/2007 | Moos et al. |
| 7,236,908 B2 | 6/2007 | Timko et al. |
| 7,239,125 B2 | 7/2007 | Hemminger et al. |
| 7,239,250 B2 | 7/2007 | Brian et al. |
| 7,245,511 B2 | 7/2007 | Lancaster et al. |
| 7,262,709 B2 | 8/2007 | Borleske et al. |
| 7,274,187 B2 | 9/2007 | Loy |
| 7,277,027 B2 | 10/2007 | Ehrke et al. |
| 7,283,062 B2 | 10/2007 | Hoiness et al. |
| 7,283,580 B2 | 10/2007 | Cumeralto |
| 7,283,916 B2 | 10/2007 | Cahill-O'Brien et al. |
| 7,298,134 B2 | 11/2007 | Weikel et al. |
| 7,298,135 B2 | 11/2007 | Briese et al. |
| 7,301,476 B2 | 11/2007 | Shuey et al. |
| 7,308,369 B2 | 12/2007 | Rudran et al. |
| 7,308,370 B2 | 12/2007 | Mason et al. |
| 7,312,721 B2 | 12/2007 | Mason et al. |
| 7,315,162 B2 | 1/2008 | Shuey |
| 7,317,404 B2 | 1/2008 | Cumeralto et al. |
| 7,327,998 B2 | 2/2008 | Kumar et al. |
| 7,336,200 B2 | 2/2008 | Osterloh et al. |
| 7,339,805 B2 | 3/2008 | Hemminger et al. |
| 7,346,030 B2 | 3/2008 | Cornwall |
| 7,348,769 B2 | 3/2008 | Ide et al. |
| 7,355,867 B2 | 4/2008 | Shuey |
| 7,362,232 B2 | 4/2008 | Holle et al. |
| 7,362,236 B2 | 4/2008 | Hoiness |
| 7,365,687 B2 | 4/2008 | Borleske et al. |
| 7,417,420 B2 | 8/2008 | Shuey |
| 7,417,557 B2 | 8/2008 | Osterloh et al. |
| 7,421,205 B2 | 9/2008 | Ramirez |
| 7,427,927 B2 | 9/2008 | Borlesky et al. |
| 7,453,373 B2 | 11/2008 | Cumeralto et al. |
| 7,471,516 B2 | 12/2008 | Voisine |
| 7,479,895 B2 | 1/2009 | Osterloh et al. |
| 7,486,056 B2 | 2/2009 | Shuey |
| 7,495,578 B2 | 2/2009 | Borleske |
| 7,504,821 B2 | 3/2009 | Shuey |
| 7,505,453 B2 | 3/2009 | Carpenter et al. |
| 7,510,422 B2 | 3/2009 | Showcatally et al. |
| 7,516,026 B2 | 4/2009 | Cornwall et al. |
| 7,535,378 B2 | 5/2009 | Cornwall |
| 7,540,766 B2 | 6/2009 | Makinson et al. |
| 7,545,135 B2 | 6/2009 | Holle et al. |
| 7,545,203 B2 | 6/2009 | Byeon et al. |
| 7,561,062 B2 | 7/2009 | Schleich et al. |
| 7,561,399 B2 | 7/2009 | Slater et al. |
| 7,583,203 B2 | 9/2009 | Uy et al. |
| 7,584,066 B2 | 9/2009 | Roytelman |
| 7,616,420 B2 | 11/2009 | Slater et al. |
| 7,626,489 B2 | 12/2009 | Berkman et al. |
| 7,630,863 B2 | 12/2009 | Zweigle et al. |
| 7,639,000 B2 | 12/2009 | Briese et al. |
| 7,656,649 B2 | 2/2010 | Loy et al. |
| 7,671,814 B2 | 3/2010 | Savage et al. |
| 7,683,642 B2 | 3/2010 | Martin et al. |
| 7,688,060 B2 | 3/2010 | Briese et al. |
| 7,688,061 B2 | 3/2010 | Briese et al. |
| 7,696,941 B2 | 4/2010 | Cunningham, Jr. |
| 7,701,199 B2 | 4/2010 | Makinson et al. |
| 7,702,594 B2 | 4/2010 | Scoggins et al. |
| 7,729,810 B2 | 6/2010 | Bell et al. |
| 7,729,852 B2 | 6/2010 | Hoiness et al. |
| 7,742,430 B2 | 6/2010 | Scoggins et al. |
| 7,746,054 B2 | 6/2010 | Shuey |
| 7,747,400 B2 | 6/2010 | Voisine |
| 7,747,534 B2 | 6/2010 | Villicana et al. |
| 7,756,030 B2 | 7/2010 | Clave et al. |
| 7,756,078 B2 | 7/2010 | Van Wyk et al. |
| 7,756,651 B2 | 7/2010 | Holdsclaw |
| 7,761,249 B2 | 7/2010 | Ramirez |
| 7,764,714 B2 | 7/2010 | Monier et al. |
| 7,860,672 B2 | 12/2010 | Richeson et al. |
| 8,301,314 B2 | 10/2012 | Deaver, Sr. et al. |
| 8,437,883 B2 | 5/2013 | Powell et al. |
| 8,577,510 B2 | 11/2013 | Powell et al. |
| 8,583,520 B1 | 11/2013 | Forbes, Jr. |
| 9,354,641 B2 * | 5/2016 | Peskin .................. G05B 13/04 |
| 2002/0109607 A1 | 8/2002 | Cumeralto et al. |
| 2002/0128748 A1 | 9/2002 | Krakovich et al. |
| 2002/0158774 A1 | 10/2002 | Johnson et al. |
| 2003/0001754 A1 | 1/2003 | Johnson et al. |
| 2003/0122686 A1 | 7/2003 | Ehrke et al. |
| 2003/0187550 A1 | 10/2003 | Wilson et al. |
| 2004/0061625 A1 | 4/2004 | Ehrke et al. |
| 2004/0066310 A1 | 4/2004 | Ehrke et al. |
| 2004/0070517 A1 | 4/2004 | Ehrke et al. |
| 2004/0119458 A1 | 6/2004 | Heuell et al. |
| 2004/0150575 A1 | 8/2004 | Lizalek et al. |
| 2004/0192415 A1 | 9/2004 | Luglio et al. |
| 2004/0218616 A1 | 11/2004 | Ardalan et al. |
| 2004/0222783 A1 | 11/2004 | Loy |
| 2005/0024235 A1 | 2/2005 | Shuey et al. |
| 2005/0090995 A1 | 4/2005 | Sonderegger |
| 2005/0110480 A1 | 5/2005 | Martin et al. |
| 2005/0119841 A1 | 6/2005 | Martin |
| 2005/0119930 A1 | 6/2005 | Simon |
| 2005/0212689 A1 | 9/2005 | Randall |
| 2005/0218873 A1 | 10/2005 | Shuey et al. |
| 2005/0237047 A1 | 10/2005 | Voisine |
| 2005/0240314 A1 | 10/2005 | Martinez |
| 2005/0251401 A1 | 11/2005 | Shuey |
| 2005/0251403 A1 | 11/2005 | Shuey |
| 2005/0270015 A1 | 12/2005 | Hemminger et al. |
| 2005/0278440 A1 | 12/2005 | Scoggins |
| 2006/0001415 A1 | 1/2006 | Fridholm et al. |
| 2006/0012935 A1 | 1/2006 | Murphy |
| 2006/0038548 A1 | 2/2006 | Shuey |
| 2006/0043961 A1 | 3/2006 | Loy |
| 2006/0044157 A1 | 3/2006 | Peters et al. |
| 2006/0044851 A1 | 3/2006 | Lancaster et al. |
| 2006/0055610 A1 | 3/2006 | Borisov et al. |
| 2006/0056493 A1 | 3/2006 | Cornwall et al. |
| 2006/0071810 A1 | 4/2006 | Scoggins et al. |
| 2006/0071812 A1 | 4/2006 | Mason, Jr. et al. |
| 2006/0074556 A1 | 4/2006 | Hoiness et al. |
| 2006/0074601 A1 | 4/2006 | Hoiness et al. |
| 2006/0085147 A1 | 4/2006 | Cornwall et al. |
| 2006/0114121 A1 | 6/2006 | Cumeralto et al. |
| 2006/0126255 A1 | 6/2006 | Slater et al. |
| 2006/0145685 A1 | 7/2006 | Ramirez |
| 2006/0145890 A1 | 7/2006 | Junker et al. |
| 2006/0158177 A1 | 7/2006 | Ramirez |
| 2006/0158348 A1 | 7/2006 | Ramirez |
| 2006/0168804 A1 | 8/2006 | Loy et al. |
| 2006/0202858 A1 | 9/2006 | Holle et al. |
| 2006/0206433 A1 | 9/2006 | Scoggins |
| 2006/0217936 A1 | 9/2006 | Mason et al. |
| 2006/0224335 A1 | 10/2006 | Borleske et al. |
| 2006/0232433 A1 | 10/2006 | Holle et al. |
| 2006/0261973 A1 | 11/2006 | Junker et al. |
| 2007/0013549 A1 | 1/2007 | Schleich et al. |
| 2007/0063868 A1 | 3/2007 | Borleske |
| 2007/0073866 A1 | 3/2007 | Rudran et al. |
| 2007/0091548 A1 | 4/2007 | Voisine |
| 2007/0096769 A1 | 5/2007 | Shuey |
| 2007/0115022 A1 | 5/2007 | Hemminger et al. |
| 2007/0124109 A1 | 5/2007 | Timko et al. |
| 2007/0124262 A1 | 5/2007 | Uy et al. |
| 2007/0147268 A1 | 6/2007 | Kelley et al. |
| 2007/0177319 A1 | 8/2007 | Hirst |
| 2007/0200729 A1 | 8/2007 | Borleske et al. |

(56) References Cited

U.S. PATENT DOCUMENTS

| | | |
|---|---|---|
| 2007/0205915 A1 | 9/2007 | Shuey et al. |
| 2007/0213880 A1 | 9/2007 | Ehlers |
| 2007/0222421 A1 | 9/2007 | Labuschagne |
| 2007/0229305 A1 | 10/2007 | Bonicatto et al. |
| 2007/0236362 A1 | 10/2007 | Brian et al. |
| 2007/0257813 A1 | 11/2007 | Vaswani et al. |
| 2007/0262768 A1 | 11/2007 | Holdsclaw |
| 2007/0271006 A1 | 11/2007 | Golden et al. |
| 2008/0001779 A1 | 1/2008 | Cahill-O'Brien et al. |
| 2008/0007247 A1 | 1/2008 | Gervals et al. |
| 2008/0007426 A1 | 1/2008 | Morand |
| 2008/0010212 A1 | 1/2008 | Moore et al. |
| 2008/0012550 A1 | 1/2008 | Shuey |
| 2008/0018492 A1 | 1/2008 | Ehrke et al. |
| 2008/0024115 A1 | 1/2008 | Makinson et al. |
| 2008/0062055 A1 | 3/2008 | Cunningham |
| 2008/0068004 A1 | 3/2008 | Briese et al. |
| 2008/0068005 A1 | 3/2008 | Briese et al. |
| 2008/0068006 A1 | 3/2008 | Briese et al. |
| 2008/0079741 A1 | 4/2008 | Martin et al. |
| 2008/0088475 A1 | 4/2008 | Martin |
| 2008/0097707 A1 | 4/2008 | Voisine |
| 2008/0111526 A1 | 5/2008 | Shuey |
| 2008/0116906 A1 | 5/2008 | Martin et al. |
| 2008/0129420 A1 | 6/2008 | Borisov et al. |
| 2008/0129537 A1 | 6/2008 | Osterloh et al. |
| 2008/0143491 A1 | 6/2008 | Deaver |
| 2008/0144548 A1 | 6/2008 | Shuey et al. |
| 2008/0180274 A1 | 7/2008 | Cumeralto et al. |
| 2008/0204272 A1 | 8/2008 | Ehrke et al. |
| 2008/0204953 A1 | 8/2008 | Shuey |
| 2008/0218164 A1 | 9/2008 | Sanderford |
| 2008/0219210 A1 | 9/2008 | Shuey et al. |
| 2008/0224891 A1 | 9/2008 | Ehrke et al. |
| 2008/0238714 A1 | 10/2008 | Ehrke et al. |
| 2008/0238716 A1 | 10/2008 | Ehrke et al. |
| 2008/0266133 A1 | 10/2008 | Martin |
| 2009/0003214 A1 | 1/2009 | Vaswani et al. |
| 2009/0003232 A1 | 1/2009 | Vaswani et al. |
| 2009/0003243 A1 | 1/2009 | Vaswani et al. |
| 2009/0003356 A1 | 1/2009 | Vaswani et al. |
| 2009/0015234 A1 | 1/2009 | Voisine et al. |
| 2009/0062970 A1 | 3/2009 | Forbes, Jr. et al. |
| 2009/0096211 A1 | 4/2009 | Stiesdal |
| 2009/0134996 A1 | 5/2009 | White, II et al. |
| 2009/0146839 A1 | 6/2009 | Reddy et al. |
| 2009/0153356 A1 | 6/2009 | Holt |
| 2009/0167558 A1 | 7/2009 | Borleske |
| 2009/0187284 A1 | 7/2009 | Kreiss et al. |
| 2009/0224940 A1 | 9/2009 | Cornwall |
| 2009/0245270 A1 | 10/2009 | Van Greunen et al. |
| 2009/0256364 A1 | 10/2009 | Gadau et al. |
| 2009/0262642 A1 | 10/2009 | Van Greunen et al. |
| 2009/0265042 A1 | 10/2009 | Mollenkopf |
| 2009/0276170 A1 | 11/2009 | Bickel |
| 2009/0278708 A1 | 11/2009 | Kelley |
| 2009/0281673 A1 | 11/2009 | Taft |
| 2009/0281679 A1 | 11/2009 | Taft et al. |
| 2009/0284251 A1 | 11/2009 | Makinson et al. |
| 2009/0287428 A1 | 11/2009 | Holdsclaw |
| 2009/0294260 A1 | 12/2009 | Makinson et al. |
| 2009/0295371 A1 | 12/2009 | Pontin et al. |
| 2009/0296431 A1 | 12/2009 | Borisov |
| 2009/0299660 A1 | 12/2009 | Winter |
| 2009/0299884 A1 | 12/2009 | Chandra |
| 2009/0300191 A1 | 12/2009 | Pace et al. |
| 2009/0309749 A1 | 12/2009 | Gilbert et al. |
| 2009/0309756 A1 | 12/2009 | Mason |
| 2009/0310511 A1 | 12/2009 | Vaswani et al. |
| 2009/0312881 A1 | 12/2009 | Venturini et al. |
| 2009/0319093 A1 | 12/2009 | Joos et al. |
| 2010/0007521 A1 | 1/2010 | Cornwall |
| 2010/0007522 A1 | 1/2010 | Morris |
| 2010/0010700 A1 | 1/2010 | Hoiness et al. |
| 2010/0013632 A1 | 1/2010 | Salewske et al. |
| 2010/0026517 A1 | 2/2010 | Cumeralto et al. |
| 2010/0036624 A1 | 2/2010 | Martin et al. |
| 2010/0036625 A1 | 2/2010 | Martin et al. |
| 2010/0040042 A1 | 2/2010 | Van Greunen et al. |
| 2010/0045479 A1 | 2/2010 | Schamber et al. |
| 2010/0060259 A1 | 3/2010 | Vaswani et al. |
| 2010/0061350 A1 | 3/2010 | Flammer, III |
| 2010/0073193 A1 | 3/2010 | Flammer, III |
| 2010/0074176 A1 | 3/2010 | Flammer, III et al. |
| 2010/0074304 A1 | 3/2010 | Flammer, III |
| 2010/0094479 A1 | 4/2010 | Keefe |
| 2010/0103940 A1 | 4/2010 | Van Greunen et al. |
| 2010/0109650 A1 | 5/2010 | Briese et al. |
| 2010/0110617 A1 | 5/2010 | Savage et al. |
| 2010/0117856 A1 | 5/2010 | Sonderegger |
| 2010/0128066 A1 | 5/2010 | Murata et al. |
| 2010/0134089 A1 | 6/2010 | Uram et al. |
| 2010/0150059 A1 | 6/2010 | Hughes et al. |
| 2010/0157838 A1 | 6/2010 | Vaswani et al. |
| 2010/0188254 A1 | 7/2010 | Johnson et al. |
| 2010/0188255 A1 | 7/2010 | Cornwall |
| 2010/0188256 A1 | 7/2010 | Cornwall et al. |
| 2010/0188257 A1 | 7/2010 | Johnson |
| 2010/0188258 A1 | 7/2010 | Cornwall et al. |
| 2010/0188259 A1 | 7/2010 | Johnson et al. |
| 2010/0188260 A1 | 7/2010 | Cornwall et al. |
| 2010/0188263 A1 | 7/2010 | Cornwall et al. |
| 2010/0188938 A1 | 7/2010 | Johnson et al. |
| 2010/0192001 A1 | 7/2010 | Cornwall et al. |
| 2010/0217550 A1 | 8/2010 | Crabtree et al. |
| 2010/0286840 A1* | 11/2010 | Powell .................... G01D 4/002 700/295 |
| 2011/0025130 A1 | 2/2011 | Hadar et al. |
| 2012/0022713 A1* | 1/2012 | Deaver, Sr. ............ G05B 17/02 700/298 |
| 2012/0041696 A1 | 2/2012 | Sanderford, Jr. et al. |
| 2012/0053751 A1 | 3/2012 | Børresen et al. |
| 2012/0136638 A1 | 5/2012 | Deschamps et al. |
| 2012/0221265 A1* | 8/2012 | Arya ....................... G01R 29/18 702/61 |
| 2012/0249278 A1 | 10/2012 | Krok et al. |
| 2012/0265355 A1* | 10/2012 | Bernheim ............... G05B 15/02 700/286 |
| 2013/0030591 A1 | 1/2013 | Powell et al. |
| 2014/0233620 A1* | 8/2014 | Bernheim ............... G05B 13/02 375/224 |
| 2014/0277788 A1 | 9/2014 | Forbes, Jr. |
| 2014/0277813 A1* | 9/2014 | Powell ................... H02J 3/1821 700/298 |
| 2014/0277814 A1* | 9/2014 | Hall ........................ H02J 3/14 700/298 |
| 2014/0319912 A1* | 10/2014 | Bell ........................ G01D 4/004 307/31 |
| 2016/0164290 A1* | 6/2016 | Hall ........................ H02J 3/12 700/298 |

FOREIGN PATENT DOCUMENTS

| | | |
|---|---|---|
| JP | S57-148533 A | 9/1982 |
| JP | 63-299722 A | 12/1988 |
| JP | H10-164756 A | 6/1998 |
| JP | 2002-247780 A | 8/2002 |
| JP | 2004-096906 A | 3/2004 |
| JP | 2006-208047 A | 8/2006 |
| JP | 2009-33811 A | 2/2009 |
| JP | 2009-65817 A | 3/2009 |
| RU | 2066084 | 8/1996 |
| RU | 2200364 | 3/2003 |
| SU | 14733008 | 4/1989 |
| WO | WO 98/26489 | 6/1998 |
| WO | WO 2008/144860 A1 | 12/2008 |

OTHER PUBLICATIONS

Bryon Flynn, "Key Smart Grid Applications", Protection & Control Journal, Jul. 2009, pp. 29-34.

(56) References Cited

OTHER PUBLICATIONS

Carl LaPlace, et al. Realizing the Smart Grid of the Future through AMI technology, 14 pages, Jun. 1, 2009.

Williams, B. R., "Distribution Capacitor Automation Provides Integrated Control of Customer Voltage Levels and Distribution Reactive Power Flow," Southern California Edison Company, Power Industry Computer Application Conference, 1995, Conference Proceedings, pp. 215-220.

Fletcher, Robert H. et al., "Integrating Engineering and Economic Analysis for Conservation Voltage Reduction," Power Engineering Society Summer Meeting, 2002 IEEE (vol. 2), pp. 725-730.

Kennedy, P. E. et al., "Conservation Voltage Reduction (CVR) at Snohmish County PUD," Transactions on Power Systems, vol. 6, No. 3, Aug. 1991, pp. 986-998.

Paseraba, J., Secondary Voltage-Var Controls Applied to Static Compensators (STATCOMs) for Fast Voltage Control and Long Term Var Management, 2002 IEEE Power Engineering Society Summer Meeting. Jul. 25, 2002. Chicago, IL, vol. 2 pp. 753-761 <DOI: 10.1109/PESS.2002.1043415>.

Willis, H. L., "Power Distribution Planning Reference Book." Second Edition, Revised and Expanded, Chapter 10, pp. 356-363 and 387, 2004.

Wilson, T. L., "Measurement and Verification of Distribution Voltage Optimization Results for the IEEE Power & Energy Society", 2010, pp. 1-9.

International Search Report and Written Opinion of the International searching Authority mailed Dec. 20, 2010 on related PCT Appln. PCT/US2010/033751.

International Search Report and Written Opinion of the International searching Authority mailed Jul. 24, 2014 on related PCT Appln. PCT/US2014/027332.

International Search Report and Written Opinion of the International searching Authority mailed Jul. 29, 2014 on related PCT Appln. PCT/US2014/027299.

International Search Report and Written Opinion of the International searching Authority mailed Aug. 7, 2014 on related PCT Appln. PCT/US2014/027310.

International Search Report and Written Opinion of the International searching Authority mailed Sep. 5, 2014 on related PCT Appln. PCT/US2014/27361.

\* cited by examiner

| DATE | TIME | ESS DATA ||||| | | EUS DATA | Delta V |
| | | MWATT | MVAR | VOLT/Vs | MVA | PF | ESS CURRENT | VAMI | Vs-VAMI |
|---|---|---|---|---|---|---|---|---|---|
| 8/19/2009 | 20:00:00 | 37.783 | -0.756 | 122.009 | 37.791 | 1 | 0.309739 | 119.152 | 2.857 |
| 8/19/2009 | 21:00:00 | 36.835 | -1.504 | 121.499 | 36.866 | 0.999 | 0.303426 | 118.391 | 3.108 |
| 8/19/2009 | 22:00:00 | 33.395 | -2.719 | 122.17 | 33.506 | 0.997 | 0.274257 | 119.217 | 2.953 |
| 8/19/2009 | 23:00:00 | 29.348 | -4.085 | 122.66 | 29.631 | 0.99 | 0.24157 | 120.087 | 2.573 |
| 8/19/2009 | 24:00:00 | 25.166 | -5.483 | 122.042 | 25.756 | 0.977 | 0.211042 | 120.133 | 1.909 |
| 8/20/2009 | 1:00:00 | 22.252 | -3.347 | 121.733 | 22.502 | 0.989 | 0.184847 | 120.476 | 1.257 |
| 8/20/2009 | 2:00:00 | 20.174 | 1.761 | 121.388 | 20.251 | 0.996 | 0.166829 | 120.44 | 0.948 |
| 8/20/2009 | 3:00:00 | 19.1 | 1.393 | 121.854 | 19.151 | 0.997 | 0.157163 | 120.874 | 0.98 |
| 8/20/2009 | 4:00:00 | 18.463 | 1.168 | 122.11 | 18.5 | 0.998 | 0.151503 | 121.311 | 0.799 |
| 8/20/2009 | 5:00:00 | 18.389 | 1.111 | 122.097 | 18.423 | 0.998 | 0.150888 | 121.512 | 0.585 |
| 8/20/2009 | 6:00:00 | 19.463 | 1.309 | 122.32 | 19.507 | 0.998 | 0.159475 | 121.612 | 0.708 |
| 8/20/2009 | 7:00:00 | 21.777 | 1.863 | 122.17 | 21.857 | 0.996 | 0.178906 | 121.13 | 1.04 |
| 8/20/2009 | 8:00:00 | 24.443 | 2.785 | 121.837 | 24.601 | 0.994 | 0.201917 | 120.201 | 1.636 |
| 8/20/2009 | 9:00:00 | 27.17 | 3.854 | 121.412 | 27.442 | 0.99 | 0.226024 | 120.026 | 1.386 |
| 8/20/2009 | 10:00:00 | 30.537 | -3.825 | 121.937 | 30.776 | 0.992 | 0.252393 | 120.246 | 1.691 |
| 8/20/2009 | 11:00:00 | 34.84 | -2.064 | 121.448 | 34.901 | 0.998 | 0.287374 | 119.579 | 1.869 |
| 8/20/2009 | 12:00:00 | 37.62 | -0.753 | 121.416 | 37.628 | 1 | 0.30991 | 119.064 | 2.352 |
| 8/20/2009 | 13:00:00 | 40.274 | 0.506 | 121.386 | 40.277 | 1 | 0.331809 | 118.922 | 2.464 |
| 8/20/2009 | 14:00:00 | 41.859 | 1.339 | 121.452 | 41.88 | 0.999 | 0.344828 | 118.381 | 3.071 |
| 8/20/2009 | 15:00:00 | 42.973 | 1.755 | 121.333 | 43.009 | 0.999 | 0.354471 | 118.051 | 3.282 |
| 8/20/2009 | 16:00:00 | 43.865 | 2.203 | 121.393 | 43.92 | 0.999 | 0.3618 | 117.734 | 3.659 |
| 8/20/2009 | 17:00:00 | 43.736 | 2.142 | 122.135 | 43.788 | 0.999 | 0.358521 | 118.757 | 3.378 |
| 8/20/2009 | 18:00:00 | 42.818 | 1.781 | 122.522 | 42.855 | 0.999 | 0.349774 | 118.835 | 3.687 |
| 8/20/2009 | 19:00:00 | 41.805 | 1.225 | 122.415 | 41.823 | 1 | 0.341649 | 118.65 | 3.765 |

FIG. 7

REGRESSION ANALYSIS: Vs-VAMI VERSUS CURRENT

THE REGRESSION EQUATION IS
Vs-VAMI = - 1.17 + 12.9 CURRENT  — V = B + IR
(SEE FIG. 5)

| PREDICTOR | Coef | SE Coef | T | P |
|---|---|---|---|---|
| CONSTANT | -1.1698 | 0.2692 | -4.34 | 0.000 |
| CURRENT | 12.8874 | 0.9990 | 12.90 | 0.000 |

S = 0.368990     R-SQ = 88.3%     R-SQ(ADJ) = 87.8%

$R^2$

ANALYSIS OF VARIANCE

| SOURCE | DF | SS | MS | F | P |
|---|---|---|---|---|---|
| REGRESSION | 1 | 22.658 | 22.658 | 166.42 | 0.000 |
| RESIDUAL ERROR | 22 | 2.995 | 0.136 | | |
| TOTAL | 23 | 25.653 | | | |

FIG. 8

| Selected | Recommen... | Locked-In | Meter ID | Phase | Feeder ID | Segment ID | Transformer... | Min Voltage | Max Voltage | Avg Voltage | Start Date | End Date |
|---|---|---|---|---|---|---|---|---|---|---|---|---|
| ☒ | ✓ | | 0009765862... | A | W19 | 17610501UG | | 115.19 | 121.82 | 119.408 | Aug 15, 2011 | Oct 5, 2011 |
| ☒ | ✓ | | 0009769529... | C | W19 | 17610501UG | | 115.19 | 121.82 | 119.456 | Aug 15, 2011 | Oct 5, 2011 |
| ☒ | ✓ | | 0009776091... | A | W19 | 17610501UG | | 115.19 | 121.82 | 119.512 | Aug 15, 2011 | Oct 5, 2011 |
| ☒ | ✓ | | 0009858486... | SINGLE | W19 | 14106004UG | | 115.29 | 121.21 | 120.071 | Sep 6, 2011 | Oct 5, 2011 |
| ☒ | ✓ | | 0009758940... | SINGLE | W19 | 10030105OH | | 115.43 | 120.34 | 118.431 | Sep 6, 2011 | Oct 5, 2011 |
| ☒ | ✓ | | 0009758941... | SINGLE | W19 | 17610502UG | | 115.56 | 121.17 | 118.65 | Sep 6, 2011 | Oct 5, 2011 |
| ☐ | | | 0009664124... | SINGLE | W19 | 15214916OH | | 115.78 | 122.06 | 119.352 | Sep 6, 2011 | Oct 5, 2011 |
| ☒ | ✓ | ✓ | 0008585550... | A | W19 | 17610501UG | | 116 | 122 | 119.935 | Sep 6, 2011 | Oct 5, 2011 |
| ☐ | | ✓ | 0008585550... | B | W19 | 17610501UG | | 116 | 122 | 119.484 | Sep 6, 2011 | Oct 5, 2011 |
| ☐ | | | 0009765908... | A | W19 | 17610501UG | | 116.02 | 121.82 | 119.979 | Aug 15, 2011 | Oct 5, 2011 |
| ☐ | | | 0009765910... | A | W19 | 17610501UG | | 116.02 | 121.82 | 119.632 | Aug 15, 2011 | Oct 5, 2011 |
| ☐ | | | 0009769444... | C | W19 | 17610501UG | | 116.02 | 121.82 | 119.408 | Aug 15, 2011 | Oct 5, 2011 |
| ☒ | ✓ | | 0009769446... | A | W19 | 17610501UG | | 116.02 | 121.82 | 119.486 | Aug 15, 2011 | Oct 5, 2011 |
| ☐ | | | 0009769449... | C | W19 | 17610501UG | | 116.02 | 144 | 120.355 | Aug 15, 2011 | Oct 5, 2011 |
| ☐ | | | 0009769448... | A | W19 | 17610501UG | | 116.02 | 121.82 | 119.564 | Aug 15, 2011 | Oct 5, 2011 |
| ☒ | ✓ | | 0009769489... | A | W19 | 17610501UG | | 116.02 | 121.82 | 119.607 | Aug 15, 2011 | Oct 5, 2011 |
| ☐ | | | 0009769491... | A | W19 | 17610501UG | | 116.02 | 121.82 | 119.564 | Aug 15, 2011 | Oct 5, 2011 |
| ☐ | | | 0009769494... | A | W19 | 17610501UG | | 116.02 | 121.82 | 119.642 | Aug 15, 2011 | Oct 5, 2011 |
| ☐ | | | 0009769529... | A | W19 | 17610501UG | | 116.02 | 122.65 | 119.984 | Aug 15, 2011 | Oct 5, 2011 |
| ☐ | | | 0009776092... | A | W19 | 17610501UG | | 116.02 | 122.65 | 119.532 | Aug 15, 2011 | Oct 5, 2011 |
| ☒ | | | 0200002459... | SINGLE | H58 | 11486557OH | | 116.17 | 122.62 | 119.932 | Aug 15, 2011 | Oct 5, 2011 |
| ☐ | | | 0009861260... | SINGLE | W19 | 17610502UG | | 116.31 | 121.67 | 119.613 | Sep 6, 2011 | Oct 5, 2011 |
| ☐ | | | 0009664072... | SINGLE | W19 | 15214916OH | | 116.36 | 122 | 119.579 | Sep 6, 2011 | Oct 5, 2011 |
| ☐ | | | 0009779327... | SINGLE | W19 | 15214916OH | | 116.5 | 121.73 | 119.38 | Sep 6, 2011 | Oct 5, 2011 |
| ☒ | | | 0009664080... | SINGLE | W19 | 15214916OH | | 116.54 | 121.49 | 119.431 | Sep 6, 2011 | Oct 5, 2011 |
| ☐ | | | 0009861136... | SINGLE | W19 | 15214916OH | | 116.54 | 121.66 | 119.436 | Sep 6, 2011 | Oct 5, 2011 |
| ☐ | | | 0009781179... | SINGLE | W19 | 14106005UG | | 116.57 | 122.45 | 119.822 | Sep 6, 2011 | Oct 5, 2011 |
| ☐ | | | 0009757773... | SINGLE | W19 | 15214916OH | | 116.59 | 121.68 | 119.348 | Sep 6, 2011 | Oct 5, 2011 |
| ☐ | | | 0200001826... | SINGLE | H58 | 10046004OH | | 116.68 | 122.89 | 120.389 | Aug 12, 2011 | Oct 5, 2011 |

FIG. 15

ELECTRIC POWER SYSTEM CONTROL WITH PLANNING OF ENERGY DEMAND AND ENERGY EFFICIENCY USING AMI-BASED DATA ANALYSIS

This application claims priority under 35 U.S.C. §119(e) to U.S. provisional patent application 61/794,623 filed on Mar. 15, 2013, which is hereby incorporated by reference in its entirety herein.

BACKGROUND

The present disclosure relates to a method, an apparatus, a system and a computer program for controlling an electric power system, including planning the distribution circuits with respect to optimizing voltage, conserving energy, and reducing demand. More particularly, the disclosure relates to an implementation of planning electrical demand and energy efficiency, using advanced metering infrastructure ("AMI")-based data analysis. This method enables the direct determination of the capability of a circuit to reduce energy usage and electrical demand based on an implementation of proposed configuration changes of an electric power system. The method may be used to accurately quantify a projection of the value of the energy efficiency and electrical demand reduction savings resulting from implementation of proposed modifications in an electric power system and compare a cost/benefit of each proposed modification. In addition, this method is capable of using the AMI-based measurements to identify specific problems with the electric power system, allowing the operation of the electric power system to be appropriately modified based on the identification of these problems.

Electricity is commonly generated at a power station by electromechanical generators, which are typically driven by heat engines fueled by chemical combustion or nuclear fission, or driven by kinetic energy flowing from water or wind. The electricity is generally supplied to end users through transmission grids as an alternating current signal. The transmission grids may include a network of power stations, transmission circuits, substations, and the like.

The generated electricity is typically stepped-up in voltage using, for example, generating step-up transformers, before supplying the electricity to a transmission system. Stepping up the voltage improves transmission efficiency by reducing the electrical current flowing in the transmission system conductors, while keeping the power transmitted nearly equal to the power input. The stepped-up voltage electricity is then transmitted through the transmission system to a distribution system, which distributes the electricity to end users. The distribution system may include a network that carries electricity from the transmission system and delivering it to end users. Typically, the network may include medium-voltage (for example, less than 69 kV) power lines, electrical substations, transformers, low-voltage (for example, less than 1 kV) distribution wiring, electric meters, and the like.

The following, the entirety of each of which is herein incorporated by reference, describe subject matter related to power generation or distribution: Engineering Optimization Methods and Applications, First Edition, G. V. Reklaitis, A. Ravindran, K. M. Ragsdell, John Wiley and Sons, 1983; Estimating Methodology for a Large Regional Application of Conservation Voltage Reduction, J. G. De Steese, S. B. Merrick, B. W. Kennedy, IEEE Transactions on Power Systems, 1990; Power Distribution Planning Reference Book, Second Edition, H. Lee Willis, 2004; Implementation of Conservation Voltage Reduction at Commonwealth Edison, IEEE Transactions on Power Systems, D. Kirshner, 1990; Conservation Voltage Reduction at Northeast Utilities, D. M. Lauria, IEEE, 1987; Green Circuit Field Demonstrations, EPRI, Palo Alto, Calif., 2009, Report 1016520; Evaluation of Conservation Voltage Reduction (CVR) on a National Level, PNNL-19596, Prepared for the U.S. Department of Energy under Contract DE-AC05-76RL01830, Pacific Northwest National Lab, July 2010; Utility Distribution System Efficiency Initiative (DEI) Phase 1, Final Market Progress Evaluation Report, No 3, E08-192 (7/2008) E08-192; Simplified Voltage Optimization (VO) Measurement and Verification Protocol, Simplified VO M&V Protocol Version 1.0, May 4, 2010; MINITAB Handbook, Updated for Release 14, fifth edition, Barbara Ryan, Brian Joiner, Jonathan Cryer, Brooks/Cole-Thomson, 2005; Minitab Software, http://www.minitab.com/en-US/products/minitab/ Statistical Software provided by Minitab Corporation.

Further, U.S. patent application 61/176,398, filed on May 7, 2009 and US publication 2013/0030591 entitled VOLTAGE CONSERVATION USING ADVANCED METERING INFRASTRUCTURE AND SUBSTATION CENTRALIZED VOLTAGE CONTROL, the entirety of which is herein incorporated by reference, describe a voltage control and energy conservation system for an electric power transmission and distribution grid configured to supply electric power to a plurality of user locations.

SUMMARY

Various embodiments described herein provide a novel method, apparatus, system and computer program for controlling an electric power system, including implementation of voltage planning for electrical energy delivery systems (EEDS) using secondary voltages measured by advanced metering infrastructure (AMI) ("AMI-based measurements"). The AMI-based measurements and voltage planning may be used to optimize the energy efficiency and demand reduction capability of the EEDS, including that specifically obtained from implementing conservation voltage reduction (CVR) in the EEDS. The AMI-based measurements and voltage planning may also be used to improve the reliability of the voltage performance for the energy usage system (EUS) and energy usage devices (EUD) attached to the electrical energy distribution connection system (EEDCS).

According to an aspect of the disclosure, the energy planning process (EPP) projects the voltage range capability of a given electrical energy delivery system (EEDS) (made up of an energy supply system (ESS) that connects electrically via the electrical energy distribution connection system (EEDCS) to one or more energy usage systems (EUS)) at the customer secondary level (the EUS) by measuring the level of change in energy usage from voltage management for the EEDS. The EPP can also determine potential impacts of proposed modifications to the equipment and/or equipment configuration of the EEDS and/or to an energy usage device (EUD) at some electrical point(s) on an electrical energy delivery system (EEDS) made up of many energy usage devices randomly using energy at any given time during the measurement. The purpose of the energy validation process (EVP) is to measure the level of change in energy usage for the EEDS for a change in voltage level. The specifics of the EVP are covered in patent application No. 61/789,085, entitled ELECTRIC POWER SYSTEM CONTROL WITH MEASUREMENT OF ENERGY DEMAND AND ENERGY EFFICIENCY USING T—DISTRIBUTIONS, filed on Mar. 15, 2013 ("the co-pending/P006 application"), the entirety of which is incorporated herein. One purpose of the EPP system of the disclosed embodiments is to estimate the capability of the EEDS to accommodate voltage change and predict the level of change available. The potential savings in energy provided by the proposed modification to the system can be calculated by multiplying the CVR factor (% change in energy/% change in voltage) (as may be calculated by the EVP, as described in the co-pending/P006 application) by the available change in voltage (as determined by the EPP) to determine the available energy and demand savings over the time interval being studied. The electrical energy supply to the electrical energy delivery system (EEDS) is measured in watts, kilowatts (kw), or Megawatts (Mw) (a) at the supply point of the ESS and (b) at the energy user system (EUS) or meter point. This measurement records the average usage of energy (AUE) at each of the supply and meter points over set time periods such as one hour.

The test for energy use improvement is divided into two basic time periods: The first is the time period when the improvement is not included, i.e., in "OFF" state. The second time period is when the improvement is included, i.e., in "ON" state. Two variables must be determined to estimate the savings capability for a modification in the EEDS: The available voltage change in voltage created by the modification and the EEDS capacity for energy change with respect to voltage change (the CVR factor, the calculation of which is described in the co-pending/P006 application).

The calculation of the change in voltage capability is the novel approach to conservation voltage reduction planning using a novel characterization of the EEDS voltage relationships that does not require a detailed loadflow model to implement. The input levels to the EEDCS from the ESS are recorded at set intervals, such as one hour periods for the time being studied. The input levels to the EUS from the EEDCS, at the same intervals for the time being studied, are measured using the AMI system and recorded. The EEDS specific relationship between the ESS measurements and the EUS usage measurements is characterized using a linear regression technique over the study period. This calculation specifically relates the effects of changes in load at the ESS to change in voltage uniquely to each customer EUS using a common methodology.

Once these linear relationships have been calculated, a simple linear model is built to represent the complex behavior of voltage at various loading levels including the effects of switching unique EUS specific loads that are embedded in the AMI collected data (e.g., the data includes the "ON" and "OFF" nature of the load switching occurring at the EUS). Then, the specific planned modification is related to the linear model so the model can calculate the new voltage ranges available from the planned modification. Using this simple linear model is a novel method of planning and predicting the voltage behavior of an EEDS caused by modifications to the EEDS.

The relationships between the modification (e.g., adding/removing capacitor banks, adding/removing regulators, reducing impedance, or adding distributed generation) are developed first by using a simple system of one ESS and a simple single phase line and a single EUS with a base load and two repeating switched loads. By comparing a traditional loadflow model of the simplified EEDS to the linear statistical representation of the voltage characteristics, the linear model changes can be obtained to relate the modifications to specific changes in the linear model. Once this is done, proposed modifications are easily checked to predict the voltage range effects and the corresponding EEDS energy savings and demand savings using the CVR factor.

Once the linear model is built then the model can be used to apply simple linear optimization to determine the best method of improving the EEDS to meet the desired energy modification. In addition this method can optimize the cost/benefit of modifications allowing the user to select the best choice of modifications for the EEDS.

According to a further aspect of the disclosure, the energy planning process (EPP) can be used to take the AMI data from multiple AMI EUS points and build a linear model of the voltage using the linearization technique. These multiple point models can be used to predict voltage behavior for a larger radial system (e.g., a group of contiguous transmission elements that emanate from a single point of connection) by relating the larger system linear characteristics to the system modification of capacitor installation, regulator installation, and impedance modifications to allow the building of a simple linear model of the voltage characteristics with multiple modifications made. With the new model representing the modifications the optimization can optimize the cost/benefit of various modifications, thus allowing the user to select the best choice of modifications for the EEDS.

According to a further aspect of the disclosure, the energy planning process (EPP) can be used to take the AMI data from multiple AMI EUS points and multiple ESS points and build a linear model of the voltage using the linearization technique. These multiple ESS and EUS point models can be used to predict voltage behavior for a larger radial system by relating the larger system linear characteristics to the system modification of capacitor installation, regulator installation, and impedance modifications to allow the building of a simple linear model of the voltage characteristics with multiple modifications made. With the new model representing the modifications the optimization can optimize the cost/benefit of various modifications, thus allowing the user to select the best choice of modifications for the EEDS.

According to a further aspect of the disclosure, the energy planning process (EPP) can be used to take the AMI data from multiple AMI EUS points and multiple ESS points and build a linear model of the voltage using the linearization technique. The linear model that exists for normal operation can be determined based on the characteristics of the linearization. Using this normal operation model as a "fingerprint", the other EUS points on the EEDS can be filtered to determine the ones, if any, that are displaying abnormal behavior characteristics and the abnormal EUS points can be compared against a list of expected characteristics denoting specific abnormal behavior that represents the potential of low reliability performance. As an example, the characteristics of a poorly connected meter base has been characterized to have certain linear characteristics in the model. The observed linear characteristics that represent this abnormal condition can be used to identify any of the EUS meters that exhibit this behavior, using the voltage data from AMI. This allows resolution of the abnormality before customer equipment failure occurs and significantly improves the reliability of the EEDS.

According to a further aspect of the disclosure, the energy planning process (EPP) can be used to take the AMI data from multiple AMI EUS points and multiple ESS points and build a linear model of the voltage using the linearization technique. Using this model and the measured AMI data the EPP can be used to project the initial group of meters that can be used in the voltage management system to control the minimum level of voltage across the EEDS for implementation of CVR.

According to a further aspect of the disclosure, the energy planning process (EPP) can be used to take the AMI data from multiple AMI EUS points and multiple ESS points and build a linear model of the voltage using the linearization technique. The voltage data can be used to provide location information about the meter connection points on the circuit using voltage correlation analysis. This method matches the voltages by magnitude and by phase using a technique that uses the voltage data for each meter to provide the statistical analysis. Common phase voltage movement is correlated and common voltage movement by circuit is identified using linear regression techniques. This information when combined with the latitude and longitude information on the meter can provide specific connectivity checks for primary based applications such as outage management and DMS real-time models.

Additional features, advantages, and embodiments of the disclosure may be set forth or apparent from consideration of the detailed description and drawings. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings:

FIG. 7 shows an example of voltage data for an EEDCS for one set of ESS voltages (Volt) and one set of $V_{AMI}$ voltages (at an EUS) taken hourly over a 24 hour period for statistical comparison from a prototype system, according to principles of the disclosure;

FIG. 8 shows an example of the results of the linear regression analysis of the example data from FIG. 7, according to the principles of the disclosure.

FIG. 15 shows an example of a summary chart for the example circuit shown in FIG. 14 that has been processed through the EPP to produce the selection of the initial meters for each block, according to principles of the disclosure.

Figure 1:
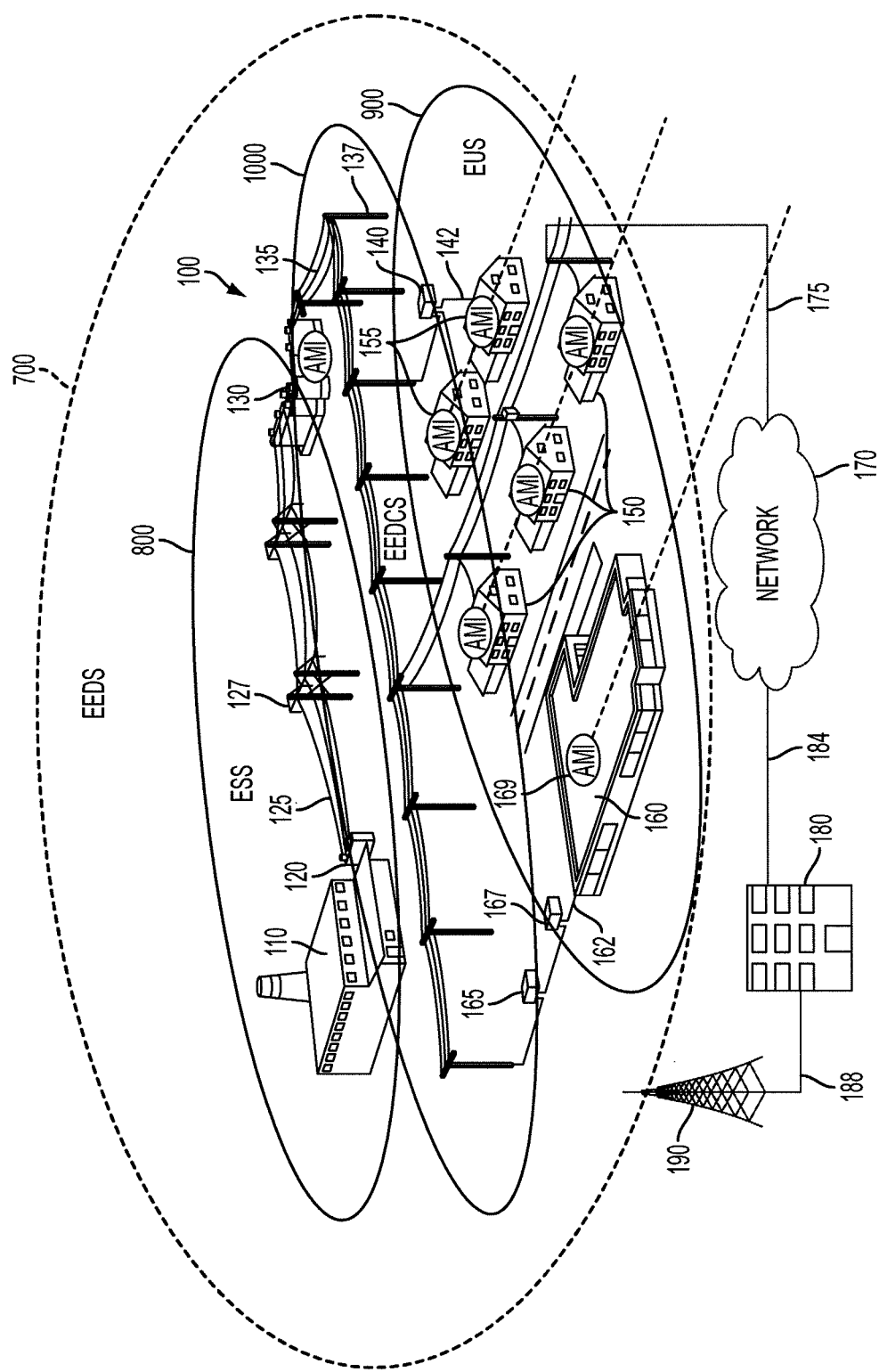
FIG. 1 shows an example of an EEDS made up of an electricity generation and distribution system connected to customer loads, according to principles of the disclosure.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A "computer", as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, or the like, or an array of processors, microprocessors, central processing units, general purpose computers, super computers, personal computers, laptop computers, palmtop computers, notebook computers, desktop computers, workstation computers, servers, or the like.

A "server", as used in this disclosure, means any combination of software and/or hardware, including at least one application and/or at least one computer to perform services for connected clients as part of a client-server architecture. The at least one server application may include, but is not limited to, for example, an application program that can accept connections to service requests from clients by sending back responses to the clients. The server may be configured to run the at least one application, often under heavy workloads, unattended, for extended periods of time with minimal human direction. The server may include a plurality of computers configured, with the at least one application being divided among the computers depending upon the workload. For example, under light loading, the at least one application can run on a single computer. However, under heavy loading, multiple computers may be required to run the at least one application. The server, or any if its computers, may also be used as a workstation.

A "database", as used in this disclosure, means any combination of software and/or hardware, including at least one application and/or at least one computer. The database may include a structured collection of records or data organized according to a database model, such as, for example, but not limited to at least one of a relational model, a hierarchical model, a network model or the like. The database may include a database management system application (DBMS) as is known in the art. At least one application may include, but is not limited to, for example, an application program that can accept connections to service requests from clients by sending back responses to the clients. The database may be configured to run the at least one application, often under heavy workloads, unattended, for extended periods of time with minimal human direction.

A "communication link", as used in this disclosure, means a wired and/or wireless medium that conveys data or information between at least two points. The wired or wireless medium may include, for example, a metallic conductor link, a radio frequency (RF) communication link, an Infrared (IR) communication link, an optical communication link, or the like, without limitation. The RF communication link may include, for example, WiFi, WiMAX, IEEE 802.11, DECT, 0G, 1G, 2G, 3G or 4G cellular standards, Bluetooth, and the like.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

A "computer-readable medium", as used in this disclosure, means any medium that participates in providing data (for example, instructions) which may be read by a computer. Such a medium may take many forms, including non-volatile media, volatile media, and transmission media. Non-volatile media may include, for example, optical or magnetic disks and other persistent memory. Volatile media may include dynamic random access memory (DRAM). Transmission media may include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a computer. For example, sequences of instruction (i) may be delivered from a RAM to a processor, (ii) may be carried over a wireless transmission medium, and/or (iii) may be formatted according to numerous formats, standards or protocols, including, for example, WiFi, WiMAX, IEEE 802.11, DECT, 0G, 1G, 2G, 3G or 4G cellular standards, Bluetooth, or the like.

Figure 2:
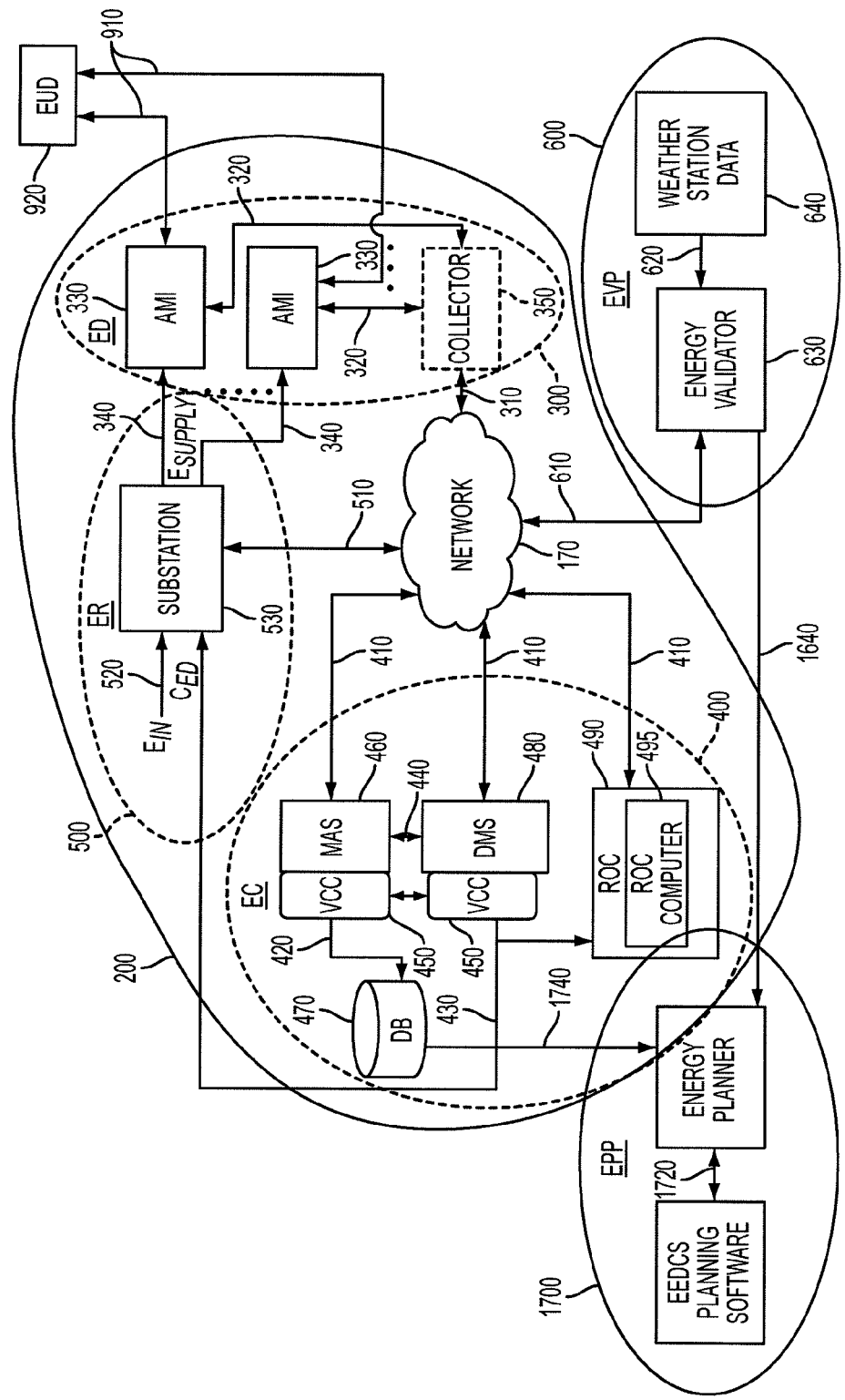
FIG. 2 shows an example of a voltage control and conservation (VCC) system being measured at the ESS meter point, the EUS made up of Advanced Metering Infrastructure (AMI) measuring voltage and energy, and the control system VCC and an EPP according to the principles of the disclosure.

According to one non-limiting example of the disclosure, an energy planning process (EPP) system 1700 (shown in FIG. 2) is provided. The EPP system 1700 performs the planning functions of the disclosed embodiments, and is described in more detail below. A voltage control and conservation (VCC) system 200 may also be provided, which includes three subsystems, including an energy delivery (ED) system 300, an energy control (EC) system 400 and an energy regulation (ER) system 500. The VCC system 200 is configured to monitor energy usage at the ED system 300 and determine one or more energy delivery parameters at the EC system (or voltage controller) 400. The EC system 400 may then provide the one or more energy delivery parameters $C_{ED}$ to the ER system 500 to adjust the energy delivered to a plurality of users for maximum energy conservation. Also shown in FIG. 2 is an energy validation system (EVP) 600. The EVP system 600 is used to monitor the change in EEDS energy from the VCC system 200. The EVP system 600 monitors through communications link 610 all metered energy flow and determines the change in energy resulting from a change in voltage control at the ER system 500. The EVP system 600 also reads weather data information through a communication link 620 from an appropriate weather station 640 to execute the EVP process 630. The EVP system 600 is more fully described in the co-pending/P006 application.

The EPP system 1700 reads the historical databases 470 via communication link 1740 for the AMI data. The EPP system 1700 can process this historical data along with measured AMI data to identify problems, if any, on the EEDS system 700. The EPP system 1700 is also able to identify any outlier points in the analysis caused by proposed system modifications and to identify the initial meters to be used for monitoring by VCC system 200 until the adaptive process (discussed in the 2013/0030591 publication) is initiated by the control system.

The VCC system 200 is also configured to monitor via communication link 610 energy change data from EVP system 600 and determine one or more energy delivery parameters at the EC system (or voltage controller) 400. The EC system 400 may then provide the one or more energy delivery parameters $C_{ED}$ to the ER system 500 to adjust the energy delivered to a plurality of users for maximum energy conservation. Similarly, the EC system 400 may use the energy change data to control the EEDS 700 in other ways. For example, components of the BEDS 700 may be modified, adjusted, added or deleted, including the addition of capacitor banks, modification of voltage regulators, changes to end-user equipment to modify customer efficiency, and other control actions.

The VCC system 200 may be integrated into, for example, an existing load curtailment plan of an electrical power supply system. The electrical power supply system may include an emergency voltage reduction plan, which may be activated when one or more predetermined events are triggered. The predetermined events may include, for example, an emergency, an overheating of electrical conductors, when the electrical power output from the transformer exceeds, for example, 80% of its power rating, or the like. The VCC system 200 is configured to yield to the load curtailment plan when the one or more predetermined events are triggered, allowing the load curtailment plan to be executed to reduce the voltage of the electrical power supplied to the plurality of users.

FIG. 1 is similar to FIG. 1 of US publication 2013/0030591, with overlays that show an example of an EEDS 700 system, including an ESS system 800, an EUS system 900 and an EEDCS system 1000 based on the electricity generation and distribution system 100, according to principles of the disclosure. The electricity generation and distribution system 100 includes an electrical power generating station 110, a generating step-up transformer 120, a substation 130, a plurality of step-down transformers 140, 165, 167, and users 150, 160. The electrical power generating station 110 generates electrical power that is supplied to the step-up transformer 120. The step-up transformer steps-up the voltage of the electrical power and supplies the stepped-up electrical power to an electrical transmission media 125. The ESS 800 includes the station 110, the step-up transformer 120, the substation 130, the step-down transformers 140, 165, 167, the ER 500 as described herein, and the electrical transmission media, including media 125, for transmitting the power from the station 110 to users 150, 160. The EUS 900 includes the ED 300 system as described herein, and a number of energy usage devices (EUD) 920 that may be consumers of power, or loads, including customer equipment and the like. The EEDCS system 1000 includes transmission media, including media 135, connections and any other equipment located between the ESS 800 and the EUS 900.

As seen in FIG. 1, the electrical transmission media may include wire conductors, which may be carried above ground by, for example, utility poles 127, 137 and/or underground by, for example, shielded conductors (not shown). The electrical power is supplied from the step-up transformer 120 to the substation 130 as electrical power $E_{In}(t)$, where the electrical power $E_{In}$ in MegaWatts (MW) may vary as a function of time t. The substation 130 converts the received electrical power $E_{In}(t)$ to $E_{Supply}(t)$ and supplies the converted electrical power $E_{Supply}(t)$ to the plurality of users 150, 160. The substation 130 may adjustably transform the voltage component $V_{In}(t)$ of the received electrical power $E_{In}(t)$ by, for example, stepping-down the voltage before supplying the electrical power $E_{Supply}(t)$ to the users 150, 160. The electrical power $E_{Supply}(t)$ supplied from the substation 130 may be received by the step-down transformers 140, 165, 167 and supplied to the users 150, 160 through a transmission medium 142, 162, such as, for example, but not limited to, underground electrical conductors (and/or above ground electrical conductors).

Each of the users 150, 160 may include an Advanced Meter Infrastructure (AMI) 330. The AMI 330 may be coupled to a Regional Operations Center (ROC) 180. The ROC 180 may be coupled to the AMI 330, by means of a plurality of communication links 175, 184, 188, a network 170 and/or a wireless communication system 190. The wireless communication system 190 may include, but is not limited to, for example, an RF transceiver, a satellite transceiver, and/or the like.

The network 170 may include, for example, at least one of the Internet, a local area network (LAN), a wide area network (WAN), a metropolitan area network (MAN), a personal area network (PAN), a campus area network, a corporate area network, the electrical transmission media 125, 135 and transformers 140, 165, 167, a global area network (GAN), a broadband area network (BAN), or the like, any of which may be configured to communicate data via a wireless and/or a wired communication medium. The network 170 may be configured to include a network topology such as, for example, a ring, a mesh, a line, a tree, a star, a bus, a full connection, or the like.

The AMI 330 may include any one or more of the following: A smart meter; a network interface (for example, a WAN interface, or the like); firmware; software; hardware; and the like. The AMI may be configured to determine any one or more of the following: kilo-Watt-hours (kWh) delivered; kWh received; kWh delivered plus kWh received; kWh delivered minus kWh received; interval data; demand data; voltage; current; phase; and the like. If the AMI is a three phase meter, then the low phase voltage may be used in the average calculation, or the values for each phase may be used independently. If the meter is a single phase meter, then the single voltage component will be averaged.

The AMI 330 may further include one or more collectors 350 (shown in FIG. 2) configured to collect AMI data from one or more AMIs 330 tasked with, for example, measuring and reporting electric power delivery and consumption at one or more of the users 150, 160. Alternatively (or additionally), the one or more collectors may be located external to the users 150, 160, such as, for example, in a housing holding the step-down transformers 140, 165, 167. Each of the collectors may be configured to communicate with the ROC 180.

The VCC system 200 plugs into the DMS and AMI systems to execute the voltage control function. In addition the EVP system 600 collects weather data and uses the AMI data from the ESS system 800 to calculate the energy savings level achieved by the VCC system 200. In addition the EPP system 1700 provides a process to continually improve the performance of the EEDS by periodically reviewing the historical AMI voltage data and providing identification of problem EUS voltage performance and the modifications needed to increase the efficiency and reliability of the EEDS system 700, using the VCC system 200.

VCC System 200

FIG. 2 shows an example of the VCC system 200 with the EVP system 600 monitoring the change in energy resulting from the VCC controlling the EEDS in the more efficient lower 5% band of voltage, according to principles of the disclosure. The VCC system 200 includes the ED system 300, the EC system 400 and the ER system 500, each of which is shown as a broken-line ellipse. The VCC system 200 is configured to monitor energy usage at the ED system 300. The ED system 300 monitors energy usage at one or more users 150, 160 (shown in FIG. 1) and sends energy usage information to the EC system 400. The EC system 400 processes the energy usage information and generates one or more energy delivery parameters $C_{ED}$, which it sends to the ER system 500 via communication link 430. The ER system 500 receives the one or more energy delivery parameters $C_{ED}$ and adjusts the electrical power $E_{Supply}(t)$ supplied to the users 150, 160 based on the received energy delivery parameters $C_{ED}$. The EVP system 600 receives the weather data and the energy usage data and calculates the energy usage improvement from the VCC 200.

The VCC system 200 minimizes power system losses, reduces user energy consumption and provides precise user voltage control. The VCC system 200 may include a closed loop process control application that uses user voltage data provided by the ED system 300 to control, for example, a voltage set point $V_{SP}$ on a distribution circuit (not shown) within the ER system 500. That is, the VCC system 200 may control the voltages $V_{Supply}(t)$ of the electrical power $E_{Supply}(t)$ supplied to the users 150, 160, by adjusting the voltage set point $V_{SP}$ of the distribution circuit in the ER system 500, which may include, for example, one or more load tap changing (LTC) transformers, one or more voltage regulators, or other voltage controlling equipment to maintain a tighter band of operation of the voltages $V_{Delivered}(t)$ of the electric power $E_{Delivered}(t)$ delivered to the users 150, 160, to lower power losses and facilitate efficient use of electrical power $E_{Delivered}(t)$ at the user locations 150 or 160.

The VCC system 200 controls or adjusts the voltage $V_{Supply}(t)$ of the electrical power $E_{Supply}(t)$ supplied from the EC system 500 based on AMI data, which includes measured voltage $V_{Meter}(t)$ data from the users 150, 160 in the ED system 300, and based on validation data from the EVP system 600 and information received from the EPP system 1700. The VCC system 200 may adjust the voltage set point $V_{SP}$ at the substation or line regulator level in the ER system 500 by, for example, adjusting the LTC transformer (not shown), circuit regulators (not shown), or the like, to maintain the user voltages $V_{Meter}(t)$ in a target voltage band $V_{Band-n}$, which may include a safe nominal operating range.

The VCC system 200 is configured to maintain the electrical power $E_{Delivered}(t)$ delivered to the users 150, 160 within one or more voltage bands $V_{Band-n}$. For example, the energy may be delivered in two or more voltage bands $V_{Band-n}$ substantially simultaneously, where the two or more voltage bands may be substantially the same or different. The value $V_{Band-n}$ may be determined by the following expression [1]:

$$V_{Band-n} = V_{SP} + \Delta V \quad [1]$$

where $V_{Band-n}$ is a range of voltages, n is a positive integer greater than zero corresponding to the number of voltage bands $V_{Band}$ that may be handled at substantially the same time, $V_{SP}$ is the voltage set point value and $\Delta V$ is a voltage deviation range.

For example, the VCC system 200 may maintain the electrical power $E_{Delivered}(t)$ delivered to the users 150, 160 within a band $V_{Band-1}$ equal to, for example, 111V to 129V for rural applications, where $V_{SP}$ is set to 120V and $\Delta V$ is set to a deviation of seven-and-one-half percent (+/−7.5%). Similarly, the VCC system 200 may maintain the electrical power $E_{Delivered}(t)$ delivered to the users 150, 160 within a band $V_{Band-2}$ equal to, for example, 114V to 126V for urban applications, where $V_{SP}$ is set to 120V and $\Delta V$ is set to a deviation of five (+/−5%).

The VCC system 200 may maintain the electrical power $E_{Delivered}(t)$ delivered to the users 150, 160 at any voltage band $V_{Band-n}$ usable by the users 150, 160, by determining appropriate values for $V_{SP}$ and $\Delta V$. In this regard, the values $V_{SP}$ and $\Delta V$ may be determined by the EC system 400 based on the energy usage information for users 150, 160, received from the ED system 300.

The EC system 400 may send the $V_{SP}$ and $\Delta V$ values to the ER system 500 as energy delivery parameters $C_{ED}$, which may also include the value $V_{Band-n}$. The ER system 500 may then control and maintain the voltage $V_{Delivered}(t)$ of the electrical power $E_{Delivered}(t)$ delivered to the users 150, 160, within the voltage band $V_{Band-n}$. The energy delivery parameters $C_{ED}$ may further include, for example, load-tap-changer (LTC) control commands.

The EVP system 600 may further measure and validate energy savings by comparing energy usage by the users 150, 160 before a change in the voltage set point value $V_{SP}$ (or voltage band $V_{Band-n}$) to the energy usage by the users 150, 160 after a change in the voltage set point value $V_{SP}$ (or voltage band $V_{Band-n}$), according to principles of the disclosure. These measurements and validations may be used to determine the effect in overall energy savings by, for example, lowering the voltage $V_{Delivered}(t)$ of the electrical power $E_{Delivered}(t)$ delivered to the users 150, 160, and to determine optimal delivery voltage bands $V_{Band-n}$ for the energy power $E_{Delivered}(t)$ delivered to the users 150, 160.

ER System 500

The ER system 500 may communicate with the ED system 300 and/or EC system 400 by means of the network 170. The ER system 500 is coupled to the network 170 and the EC system 400 by means of communication links 510 and 430, respectively. The EC system 500 is also coupled to the ED system 300 by means of the power lines 340, which may include communication links.

The ER system 500 includes a substation 530 which receives the electrical power supply $E_{In}(t)$ from, for example, the power generating station 110 (shown in FIG. 1) on a line 520. The electrical power $E_{In}(t)$ includes a voltage $V_{In}(t)$ component and a current $I_{In}(t)$ component. The substation 530 adjustably transforms the received electrical power $E_{In}(t)$ to, for example, reduce (or step-down) the voltage component $V_{In}(t)$ of the electrical power $E_{In}(t)$ to a voltage value $V_{Supply}(t)$ of the electrical power $E_{Supply}(t)$ supplied to the plurality of AMIs 330 on the power supply lines 340.

The substation 530 may include a transformer (not shown), such as, for example, a load tap change (LTC) transformer. In this regard, the substation 530 may further include an automatic tap changer mechanism (not shown), which is configured to automatically change the taps on the LTC transformer. The tap changer mechanism may change the taps on the LTC transformer either on-load (on-load tap changer, or OLTC) or off-load, or both. The tap changer mechanism may be motor driven and computer controlled. The substation 530 may also include a buck/boost transformer to adjust and maximize the power factor of the electrical power $E_{Delivered}(t)$ supplied to the users on power supply lines 340.

Additionally (or alternatively), the substation 530 may include one or more voltage regulators, or other voltage controlling equipment, as known by those having ordinary skill in the art, that may be controlled to maintain the output the voltage component $V_{Supply}(t)$ of the electrical power $E_{Supply}(t)$ at a predetermined voltage value or within a predetermined range of voltage values.

The substation 530 receives the energy delivery parameters $C_{ED}$ from the EC system 400 on the communication link 430. The energy delivery parameters $C_{ED}$ may include, for example, load tap coefficients when an LTC transformer is used to step-down the input voltage component $V_{In}(t)$ of the electrical power $E_{In}(t)$ to the voltage component $V_{Supply}(t)$ of the electrical power $E_{Supply}(t)$ supplied to the ED system 300. In this regard, the load tap coefficients may be used by the ER system 500 to keep the voltage component $V_{Supply}(t)$ on the low-voltage side of the LTC transformer at a predetermined voltage value or within a predetermined range of voltage values.

The LTC transformer may include, for example, seventeen or more steps (thirty-five or more available positions), each of which may be selected based on the received load tap coefficients. Each change in step may adjust the voltage component $V_{Supply}(t)$ on the low voltage side of the LTC transformer by as little as, for example, about five-sixteenths (0.3%), or less.

Alternatively, the LTC transformer may include fewer than seventeen steps. Similarly, each change in step of the LTC transformer may adjust the voltage component $V_{Supply}(t)$ on the low voltage side of the LTC transformer by more than, for example, about five-sixteenths (0.3%).

The voltage component $V_{Supply}(t)$ may be measured and monitored on the low voltage side of the LTC transformer by, for example, sampling or continuously measuring the voltage component $V_{Supply}(t)$ of the stepped-down electrical power $E_{Supply}(t)$ and storing the measured voltage component $V_{Supply}(t)$ values as a function of time t in a storage (not shown), such as, for example, a computer readable medium. The voltage component $V_{Supply}(t)$ may be monitored on, for example, a substation distribution bus, or the like. Further, the voltage component $V_{Supply}(t)$ may be measured at any point where measurements could be made for the transmission or distribution systems in the ER system 500.

Similarly, the voltage component $V_{In}(t)$ of the electrical power $E_{In}(t)$ input to the high voltage side of the LTC transformer may be measured and monitored. Further, the current component $I_{Supply}(t)$ of the stepped-down electrical power $E_{Supply}(t)$ and the current component $I_{In}(t)$ of the electrical power $E_{In}(t)$ may also be measured and monitored. In this regard, a phase difference $\phi_{In}(t)$ between the voltage $V_{In}(t)$ and current $I_{In}(t)$ components of the electrical power $E_{In}(t)$ may be determined and monitored. Similarly, a phase difference $\phi_{Supply}(t)$ between the voltage $V_{Supply}(t)$ and current $I_{Supply}(t)$ components of the electrical energy supply $E_{Supply}(t)$ may be determined and monitored.

The ER system 500 may provide electrical energy supply status information to the EC system 400 on the communication links 430 or 510. The electrical energy supply information may include the monitored voltage component $V_{Supply}(t)$. The electrical energy supply information may further include the voltage component $V_{In}(t)$, current components $I_{In}(t)$, $I_{Supply}(t)$, and/or phase difference values $\phi_{In}(t)$, $\phi_{Supply}(t)$, as a function of time t. The electrical energy supply status information may also include, for example, the load rating of the LTC transformer.

The electrical energy supply status information may be provided to the EC system 400 at periodic intervals of time, such as, for example, every second, 5 sec., 10 sec., 30 sec., 60 sec., 120 sec., 600 sec., or any other value within the scope and spirit of the disclosure, as determined by one having ordinary skill in the art. The periodic intervals of time may be set by the EC system 400 or the ER system 500. Alternatively, the electrical energy supply status information may be provided to the EC system 400 or ER system 500 intermittently.

Further, the electrical energy supply status information may be forwarded to the EC system 400 in response to a request by the EC system 400, or when a predetermined event is detected. The predetermined event may include, for example, when the voltage component $V_{Supply}(t)$ changes by an amount greater (or less) than a defined threshold value $V_{SupplyThreshold}$ (for example, 130V) over a predetermined interval of time, a temperature of one or more components in the ER system 500 exceeds a defined temperature threshold, or the like.

ED System 300

The ED system 300 includes a plurality of AMIs 330. The ED system 300 may further include at least one collector 350, which is optional. The ED system 300 may be coupled to the network 170 by means of a communication link 310. The collector 350 may be coupled to the plurality of AMIs 330 by means of a communication link 320. The AMIs 330 may be coupled to the ER system 500 by means of one or more power supply lines 340, which may also include communication links.

Each AMI 330 is configured to measure, store and report energy usage data by the associated users 150, 160 (shown in FIG. 1). Each AMI 330 is further configured to measure and determine energy usage at the users 150, 160, including the voltage component $V_{Meter}(t)$ and current component $I_{Meter}(t)$ of the electrical power $E_{Meter}(t)$ used by the users 150, 160, as a function of time. The AMIs 330 may measure the voltage component $V_{Meter}(t)$ and current component $I_{Meter}(t)$ of the electrical power $E_{Meter}(t)$ at discrete times $t_s$, where s is a sampling period, such as, for example, s=5 sec., 10 sec., 30 sec., 60 sec., 300 sec., 600 sec., or more. For example, the AMIs 330 may measure energy usage every, for example, minute ($t_{60\ sec}$), five minutes ($t_{300\ sec}$), ten minutes ($t_{600\ sec}$), or more, or at time intervals variably set by the AMI 330 (for example, using a random number generator).

The AMIs 330 may average the measured voltage $V_{Meter}(t)$ and/or $I_{Meter}(t)$ values over predetermined time intervals (for example, 5 min., 10 min., 30 min., or more). The AMIs 330 may store the measured electrical power usage $E_{Meter}(t)$ including the measured voltage component $V_{Meter}(t)$ and/or current component $I_{Meter}(t)$ as AMI data in a local (or remote) storage (not shown), such as, for example, a computer readable medium.

Each AMI 330 is also capable of operating in a "report-by-exception" mode for any voltage $V_{Meter}(t)$, current $I_{Meter}(t)$, or energy usage $E_{Meter}(t)$ that falls outside of a target component band. The target component band may include, a target voltage band, a target current band, or a target energy usage band. In the "report-by-exception" mode, the AMI 330 may sua sponte initiate communication and send AMI data to the EC system 400. The "report-by-exception" mode may be used to reconfigure the AMIs 330 used to represent, for example, the lowest voltages on the circuit as required by changing system conditions.

The AMI data may be periodically provided to the collector 350 by means of the communication links 320. Additionally, the AMIs 330 may provide the AMI data in response to a AMI data request signal received from the collector 350 on the communication links 320.

Alternatively (or additionally), the AMI data may be periodically provided directly to the EC system 400 (for example, the MAS 460) from the plurality of AMIs, by means of, for example, communication links 320, 410 and network 170. In this regard, the collector 350 may be bypassed, or eliminated from the ED system 300. Furthermore, the AMIs 330 may provide the AMI data directly to the EC system 400 in response to a AMI data request signal received from the EC system 400. In the absence of the collector 350, the EC system (for example, the MAS 460) may carry out the functionality of the collector 350 described herein.

The request signal may include, for example, a query (or read) signal and a AMI identification signal that identifies the particular AMI 330 from which AMI data is sought. The AMI data may include the following information for each AMI 330, including, for example, kilo-Watt-hours (kWh) delivered data, kWh received data, kWh delivered plus kWh received data, kWh delivered minus kWh received data, voltage level data, current level data, phase angle between voltage and current, kVar data, time interval data, demand data, and the like.

Additionally, the AMIs 330 may send the AMI data to the meter automation system server MAS 460. The AMI data may be sent to the MAS 460 periodically according to a predetermined schedule or upon request from the MAS 460.

The collector 350 is configured to receive the AMI data from each of the plurality of AMIs 330 via the communication links 320. The collector 350 stores the received AMI data in a local storage (not shown), such as, for example, a computer readable medium (e.g., a non-transitory computer readable medium). The collector 350 compiles the received AMI data into a collector data. In this regard, the received AMI data may be aggregated into the collector data based on, for example, a geographic zone in which the AMIs 330 are located, a particular time band (or range) during which the AMI data was collected, a subset of AMIs 330 identified in a collector control signal, and the like. In compiling the received AMI data, the collector 350 may average the voltage component $V_{Meter}(t)$ values received in the AMI data from all (or a subset of all) of the AMIs 330.

The EC system 400 is able to select or alter a subset of all of the AMIs 330 to be monitored for predetermined time intervals, which may include for example 15 minute intervals. It is noted that the predetermined time intervals may be shorter or longer than 15 minutes. The subset of all of the AMIs 330 is selectable and can be altered by the EC system 400 as needed to maintain minimum level control of the voltage $V_{Supply}(t)$ supplied to the AMIs 330.

The collector 350 may also average the electrical power $E_{Meter}(t)$ values received in the AMI data from all (or a subset of all) of the AMIs 330. The compiled collector data may be provided by the collector 350 to the EC system 400 by means of the communication link 310 and network 170. For example, the collector 350 may send the compiled collector data to the MAS 460 (or ROC 490) in the EC system 400.

The collector 350 is configured to receive collector control signals over the network 170 and communication link 310 from the EC system 400. Based on the received collector control signals, the collector 350 is further configured to select particular ones of the plurality of AMIs 330 and query the meters for AMI data by sending a AMI data request signal to the selected AMIs 330. The collector 350 may then collect the AMI data that it receives from the selected AMIs 330 in response to the queries. The selectable AMIs 330 may include any one or more of the plurality of AMIs 330. The collector control signals may include, for example, an identification of the AMIs 330 to be queried (or read), time(s) at which the identified AMIs 330 are to measure the $V_{Meter}(t)$, $I_{Meter}(t)$, $E_{Meter}(t)$ and/or $\phi_{Meter}(t)$ ($\phi_{Meter}(t)$ is the phase difference between the voltage $V_{Meter}(t)$ and current $I_{Meter}(t)$ components of the electrical power $E_{Meter}(t)$ measured at the identified AMI 330), energy usage information since the last reading from the identified AMI 330, and the like. The collector 350 may then compile and send the compiled collector data to the MAS 460 (and/or ROC 490) in the EC system 400.

EC System 400

The EC system 400 may communicate with the ED system 300 and/or ER system 500 by means of the network 170. The EC system 400 is coupled to the network 170 by means of one or more communication links 410. The EC system 400 may also communicate directly with the ER system 500 by means of a communication link 430.

The EC system 400 includes the MAS 460, a database (DB) 470, a distribution management system (DMS) 480, and a regional operation center (ROC) 490. The ROC 490 may include a computer (ROC computer) 495, a server (not shown) and a database (not shown). The MAS 460 may be coupled to the DB 470 and DMS 480 by means of communication links 420 and 440, respectively. The DMS 480 may be coupled to the ROC 490 and ER SYSTEM 500 by means of the communication link 430. The database 470 may be located at the same location as (for example, proximate to, or within) the MAS 460, or at a remote location that may be accessible via, for example, the network 170.

The EC system 400 is configured to de-select, from the subset of monitored AMIs 330, a AMI 330 that the EC system 400 previously selected to monitor, and select the AMI 330 that is outside of the subset of monitored AMIs 330, but which is operating in the report-by-exception mode. The EC system 400 may carry out this change after receiving the sua sponte AMI data from the non-selected AMI 330. In this regard, the EC system 400 may remove or terminate a connection to the de-selected AMI 330 and create a new connection to the newly selected AMI 330 operating in the report-by-exception mode. The EC system 400 is further configured to select any one or more of the plurality of AMIs 330 from which it receives AMI data comprising, for example, the lowest measured voltage component $V_{Meter}(t)$, and generate an energy delivery parameter $C_{ED}$ based on the AMI data received from the AMI(s) 330 that provide the lowest measured voltage component $V_{Meter}(t)$.

The MAS 460 may include a computer (not shown) that is configured to receive the collector data from the collector 350, which includes AMI data collected from a selected subset (or all) of the AMIs 330. The MAS 460 is further configured to retrieve and forward AMI data to the ROC 490 in response to queries received from the ROC 490. The MAS 460 may store the collector data, including AMI data in a local storage and/or in the DB 470.

The DMS 480 may include a computer that is configured to receive the electrical energy supply status information from the substation 530. The DMS 480 is further configured to retrieve and forward measured voltage component $V_{Meter}$ (t) values and electrical power $E_{Meter}(t)$ values in response to queries received from the ROC 490. The DMS 480 may be further configured to retrieve and forward measured current component $I_{Meter}(t)$ values in response to queries received from the ROC 490. The DMS 480 also may be further configured to retrieve all "report-by-exception" voltages $V_{Meter}(t)$ from the AMIs 330 operating in the "report-by-exception" mode and designate the voltages $V_{Meter}(t)$ as one of the control points to be continuously read at predetermined times (for example, every 15 minutes, or less (or more), or at varying times). The "report-by-exception" voltages $V_{Meter}(t)$ may be used to control the EC 500 set points.

The DB 470 may include a plurality of relational databases (not shown). The DB 470 includes a large number of records that include historical data for each AMI 330, each collector 350, each substation 530, and the geographic area(s) (including latitude, longitude, and altitude) where the AMIs 330, collectors 350, and substations 530 are located.

For instance, the DB 470 may include any one or more of the following information for each AMI 330, including: a geographic location (including latitude, longitude, and altitude); a AMI identification number; an account number; an account name; a billing address; a telephone number; a AMI type, including model and serial number; a date when the AMI was first placed into use; a time stamp of when the AMI was last read (or queried); the AMI data received at the time of the last reading; a schedule of when the AMI is to be read (or queried), including the types of information that are to be read; and the like.

The historical AMI data may include, for example, the electrical power $E_{Meter}(t)$ used by the particular AMI 330, as a function of time. Time t may be measured in, for example, discrete intervals at which the electrical power $E_{Meter}$ magnitude (kWh) of the received electrical power $E_{Meter}(t)$ is measured or determined at the AMI 330. The historical AMI data includes a measured voltage component $V_{Meter}(t)$ of the electrical energy $E_{Meter}(t)$ al received at the AMI 330. The historical AMI data may further include a measured current component $I_{Meter}(t)$ and/or phase difference $\phi_{Meter}(t)$ of the electrical power $E_{Meter}(t)$ received at the AMI 330.

As noted earlier, the voltage component $V_{Meter}(t)$ may be measured at a sampling period of, for example, every five seconds, ten seconds, thirty seconds, one minute, five minutes, ten minutes, fifteen minutes, or the like. The current component $I_{Meter}(t)$ and/or the received electrical power $E_{Meter}(t)$ values may also be measured at substantially the same times as the voltage component $V_{Meter}(t)$.

Given the low cost of memory, the DB 470 may include historical data from the very beginning of when the AMI data was first collected from the AMIs 330 through to the most recent AMI data received from the AMI 330.

The DB 470 may include a time value associated with each measured voltage component $V_{Meter}(t)$, current component $I_{Meter}(t)$, phase component $\phi_{Meter}(t)$ and/or electrical power $E_{Meter}(t)$, which may include a timestamp value generated at the AMI 330. The timestamp value may include, for example, a year, a month, a day, an hour, a minute, a second, and a fraction of a second. Alternatively, the timestamp may be a coded value which may be decoded to determine a year, a month, a day, an hour, a minute, a second, and a fraction of a second, using, for example, a look up table. The ROC 490 and/or AMIs 330 may be configured to receive, for example, a WWVB atomic clock signal transmitted by the U.S. National Institute of Standards and Technology (NIST), or the like and synchronize its internal clock (not shown) to the WWVB atomic clock signal.

The historical data in the DB 470 may further include historical collector data associated with each collector 350. The historical collector data may include any one or more of the following information, including, for example: the particular AMIs 330 associated with each collector 350; the geographic location (including latitude, longitude, and altitude) of each collector 350; a collector type, including model and serial number; a date when the collector 350 was first placed into use; a time stamp of when collector data was last received from the collector 350; the collector data that was received; a schedule of when the collector 350 is expected to send collector data, including the types of information that are to be sent; and the like.

The historical collector data may further include, for example, an external temperature value $T_{Collector}(t)$ measured outside of each collector 350 at time t. The historical collector data may further include, for example, any one or more of the following for each collector 350: an atmospheric pressure value $P_{Collector}(t)$ measured proximate the collector 350 at time t; a humidity value $H_{Collector}(t)$ measured proximate the collector 350 at time t; a wind vector value $W_{Collector}(t)$ measured proximate the collector 350 at time t, including direction and magnitude of the measured wind; a solar irradiant value $L_{Collector}(t)$ (kW/m$^2$) measured proximate the collector 350 at time t; and the like.

The historical data in the DB 470 may further include historical substation data associated with each substation 530. The historical substation data may include any one or more of the following information, including, for example: the identifications of the particular AMIs 330 supplied with electrical energy $E_{Supply}(t)$ by the substation 530; the geographic location (including latitude, longitude, and altitude) of the substation 530; the number of distribution circuits; the number of transformers; a transformer type of each transformer, including model, serial number and maximum Megavolt Ampere (MVA) rating; the number of voltage regulators; a voltage regulator type of each voltage regulator, including model and serial number; a time stamp of when substation data was last received from the substation 530; the substation data that was received; a schedule of when the substation 530 is expected to provide electrical energy supply status information, including the types of information that are to be provided; and the like.

The historical substation data may include, for example, the electrical power $E_{Supply}(t)$ supplied to each particular AMI 330, where $E_{Supply}(t)$ is measured or determined at the output of the substation 530. The historical substation data includes a measured voltage component $V_{Supply}(t)$ of the supplied electrical power $E_{Supply}(t)$, which may be measured, for example, on the distribution bus (not shown) from the transformer. The historical substation data may further include a measured current component $I_{Supply}(t)$ of the supplied electrical power $E_{Supply}(t)$. As noted earlier, the voltage component $V_{Supply}(t)$, the current component $I_{Supply}(t)$, and/or the electrical power $E_{Supply}(t)$ may be measured at a sampling period of, for example, every five seconds, ten seconds, thirty seconds, a minute, five minutes, ten minutes, or the like. The historical substation data may further include a phase difference value $\phi_{Supply}(t)$ between the voltage $V_{Supply}(t)$ and current $T_{Supply}(t)$ signals of the electrical power $E_{Supply}(t)$, which may be used to determine the power factor of the electrical power $E_{Supply}(t)$ supplied to the AMIs 330.

The historical substation data may further include, for example, the electrical power $E_{In}(t)$ received on the line 520 at the input of the substation 530, where the electrical power $E_{In}(t)$ is measured or determined at the input of the substation 530. The historical substation data may include a measured voltage component $V_{In}(t)$ of the received electrical power $E_{In}(t)$, which may be measured, for example, at the input of the transformer. The historical substation data may further include a measured current component $I_{In}(t)$ of the received electrical power $E_{In}(t)$. As noted earlier, the voltage component $V_{In}(t)$, the current component $I_{In}(t)$, and/or the electrical power $E_{In}(t)$ may be measured at a sampling period of, for example, every five seconds, ten seconds, thirty seconds, a minute, five minutes, ten minutes, or the like. The historical substation data may further include a phase difference $\phi_{In}(t)$ between the voltage component $V_{In}(t)$ and current component $I_{In}(t)$ of the electrical power $E_{In}(t)$. The power factor of the electrical power $E_{In}(t)$ may be determined based on the phase difference $\phi_{In}(t)$.

According to an aspect of the disclosure, the EC system 400 may save aggregated kW data at the substation level, voltage data at the substation level, and weather data to compare to energy usage per AMI 330 to determine the energy savings from the VCC system 200, and using linear regression to remove the effects of weather, load growth, economic effects, and the like, from the calculation.

In the VCC system 200, control may be initiated from, for example, the ROC computer 495. In this regard, a control screen 305 may be displayed on the ROC computer 495, as shown, for example, in FIG. 3 of the US 2013/0030591 publication. The control screen 305 may correspond to data for a particular substation 530 (for example, the TRABUE SUBSTATION) in the ER system 500. The ROC computer 495 can control and override (if necessary), for example, the substation 530 load tap changing transformer based on, for example, the AMI data received from the ED system 300 for the users 150, 160. The ED system 300 may determine the voltages of the electrical power supplied to the user locations 150, 160, at predetermined (or variable) intervals, such as, e.g., on average each 15 minutes, while maintaining the voltages within required voltage limits.

For system security, the substation 530 may be controlled through the direct communication link 430 from the ROC 490 and/or DMS 480, including transmission of data through communication link 430 to and from the ER 500, EUS 300 and EVP 600.

Furthermore, an operator can initiate a voltage control program on the ROC computer 490, overriding the controls, if necessary, and monitoring a time it takes to read the user voltages $V_{Meter}(t)$ being used for control of, for example, the substation LTC transformer (not shown) in the ER system 500.

EVP System 600

FIG. 2 of the co-pending/P006 application shows the energy validation process 600 for determining the amount of conservation in energy per customer realized by operating the VCC system in FIGS. 1-2 of the present application. The process is started 601 and the data the ON and OFF periods is loaded 602 by the process manager. The next step is to collect 603 the hourly voltage and power (MW) data from the metering data points on the VCC system from the DMS 480 which may be part of a supervisory control and data acquisition (SCADA) type of industrial control system. Next the corresponding weather data is collected 604 for the same hourly conditions. The data is processed 605, 606, 607, 608 to improve its quality using filters and analysis techniques to eliminate outliers that could incorrectly affect the results, as describe further below. If hourly pairing is to be done the hourly groups are determined 609 using the linear regression techniques. The next major step is to determine 611, 612, 613, 614, 615, 616, 617 the optimal pairing of the samples, as described further below.

EPP System 1700

FIG. 2 also shows an example of the EPP system 1700 applied to a distribution circuit, that also may include the VCC system 200 and the EVP system 600, as discussed previously. The EPP system 1700 collects the historic energy and voltage data from the AMI system from database 470 and/or the distribution management systems (DMS) 480 and combines this with the CVR factor analysis from the EVP system 600 (discussed in detail in the co-pending/P006 application) to produce a robust planning process (EPP system 1700) for correcting problems and improving the capability of the VCC system 200 to increase the energy efficiency and demand reduction applications.

Figure 3:
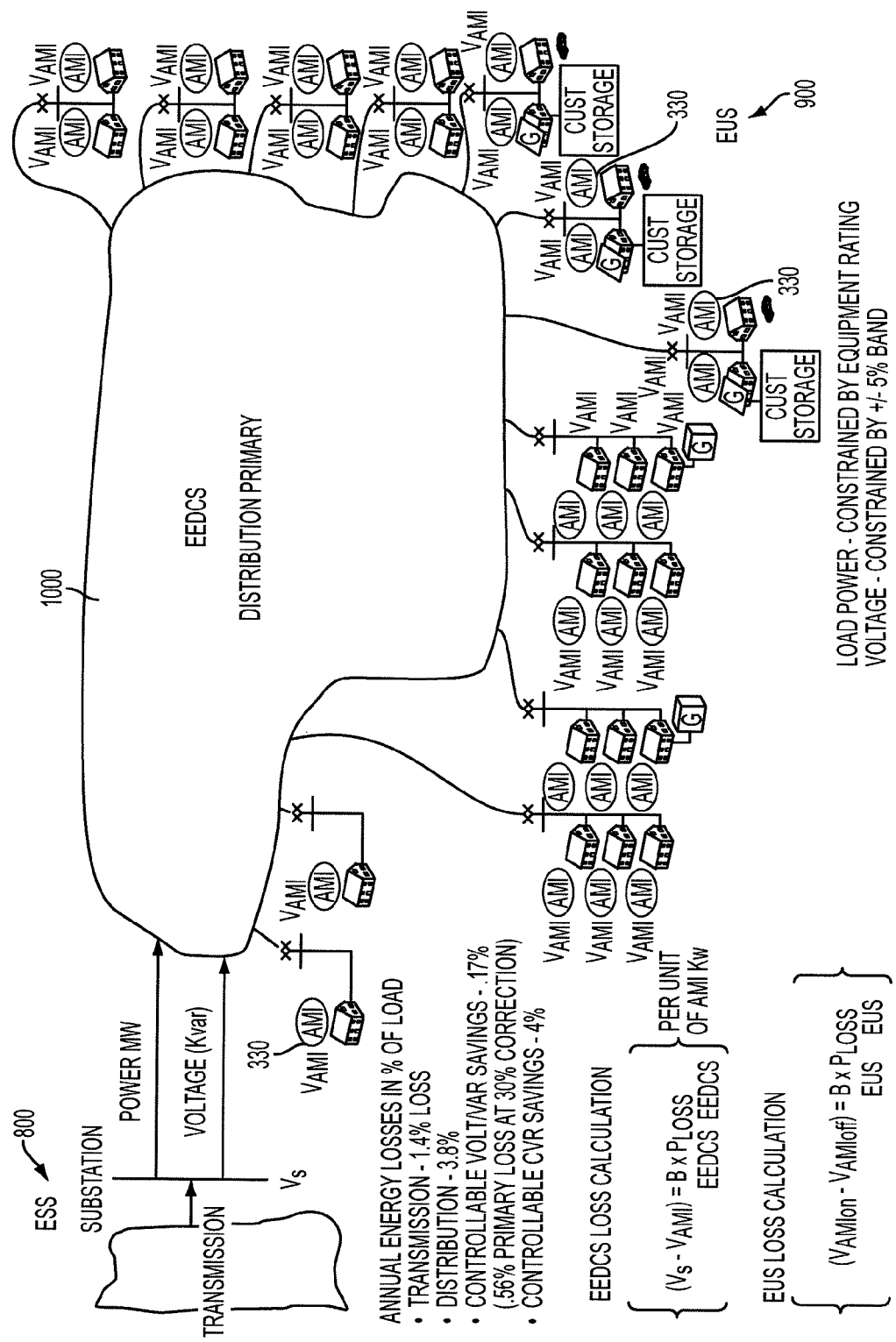
FIG. 3 shows an example of an EEDS made up of an EES, an EEDCS and multiple EUS, and outlines the methods of determining losses in the EEDCS and the EUS associated with voltage conservation control (VCC), according to principles of the disclosure.

FIG. 3 shows the overview of the breakdown of the approach to the EPP system 1700. The ESS 800 supplies energy and voltage from fixed points tied to the transmission and generation sources on the ESS 800. The EEDCS 1000 connects the ESS 800 to the EUS 900 with primary and secondary electrical connections, typical to electric distribution systems. The AMI meters 330 of AMI system measure both the inputs from the ESS 800 in energy and voltage and the inputs to the EUS 900 in energy and voltage. As show in FIG. 3, the energy losses in the EEDCS 1000 can be linearized based on the voltage drop from the ESS 800 to the EUS 900, as represented by the equation: $V_S - V_{AMI} = B_{EEDCS} \times P_{LossEEDCS}$, where Vs is the ESS voltage, $V_{AMI}$ is the EUS voltage (as measured by AMI 330), $B_{EEDCS}$ represents the slope of the linear regression, and $P_{LossEEDCS}$ represents the loss energy losses in the EEDCS 1000. Similarly, the energy "loss" in an EUS 900 (e.g., the difference in energy between when the load is in the ON and OFF states) can be linearized based on the voltage difference between a measurement in the load-ON state and a measurement in the load-OFF state, as represented by the equation: $V_{AMIon} - V_{AMIoff} = B_{EUS} \times P_{LossEUS}$, where $V_{AMIon}$ is the EUS voltage in the ON state, $V_{Amioff}$ is the EUS voltage in the OFF state, $B_{EUS}$ represents the slope of the linear regression, and $P_{LossEUS}$ represents the difference in energy between the load-ON and load-OFF states. The percentage of energy loss in the EEDCS 1000 that can be controlled is orders of magnitude lower that the percentage of energy loss on the EUS 900 that can be controlled. As an example. on the distribution system the EEDCS 1000 losses are less than 5% of the total and the losses on the EUS 900 are more than 95% of the total.

Using these principles, and the relationship in ESS 800 voltages and EUS 900 voltages, a performance criteria definition can be derived to allow full optimization of the EEDCS 1000 design based on the independent variables. Based on the linearization of the power and voltage relationships, this enables optimization on a near radial EEDCS 1000 which can be formulated as a search of the boundary conditions of the linear optimization problem.

Figure 4:
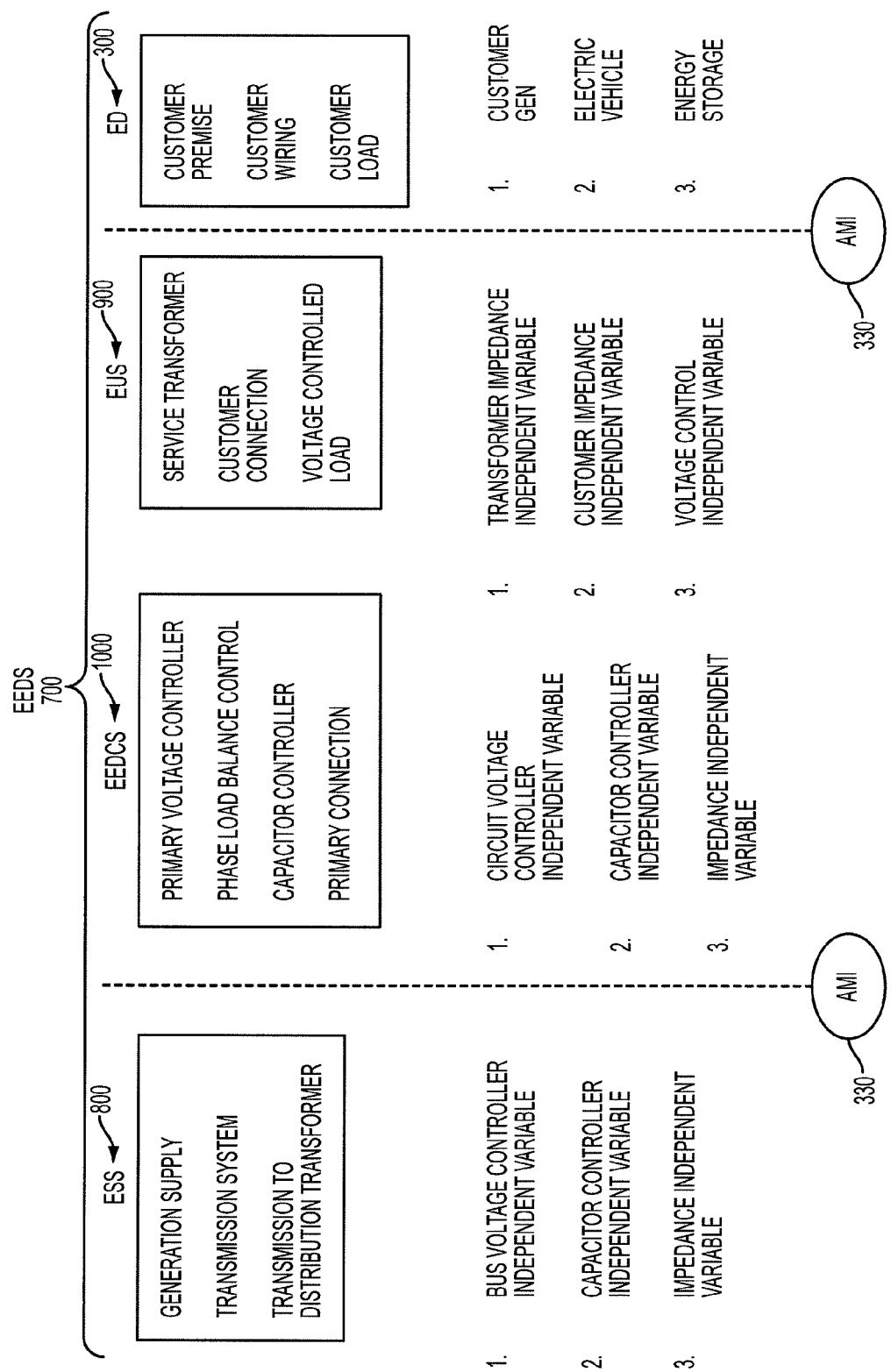
FIG. 4 shows an example of an Energy Planning Process (EPP) system with metering points (AMI) used in analysis, including the systems that affect voltage control as well as the devices or equipment that can be modified to change the EEDS performance according to principles of the disclosure.

FIG. 4 describes the planning variables and measurement systems that are used to build the EPP system 1700 and provide the input for the voltage optimization design. The top boxes denote each of the systems within the EEDS 700, e.g., ESS 800, EEDCS 1000, EUS 900 and ED system 300. The list below each of the boxes include examples of controllable planning elements that may be optimized and provided for cost/benefit analysis using the EPP system 1700. The cost/benefit analysis can be included in the optimization or the list of modifications from the voltage optimization can be broken into a prioritized list of project modifications to be evaluated in sequence by cost/benefit. The AMI meter points 330 denote the locations at which measurements are taken that are used to formulate the model and the data needed for the optimization calculations.

Figure 5:
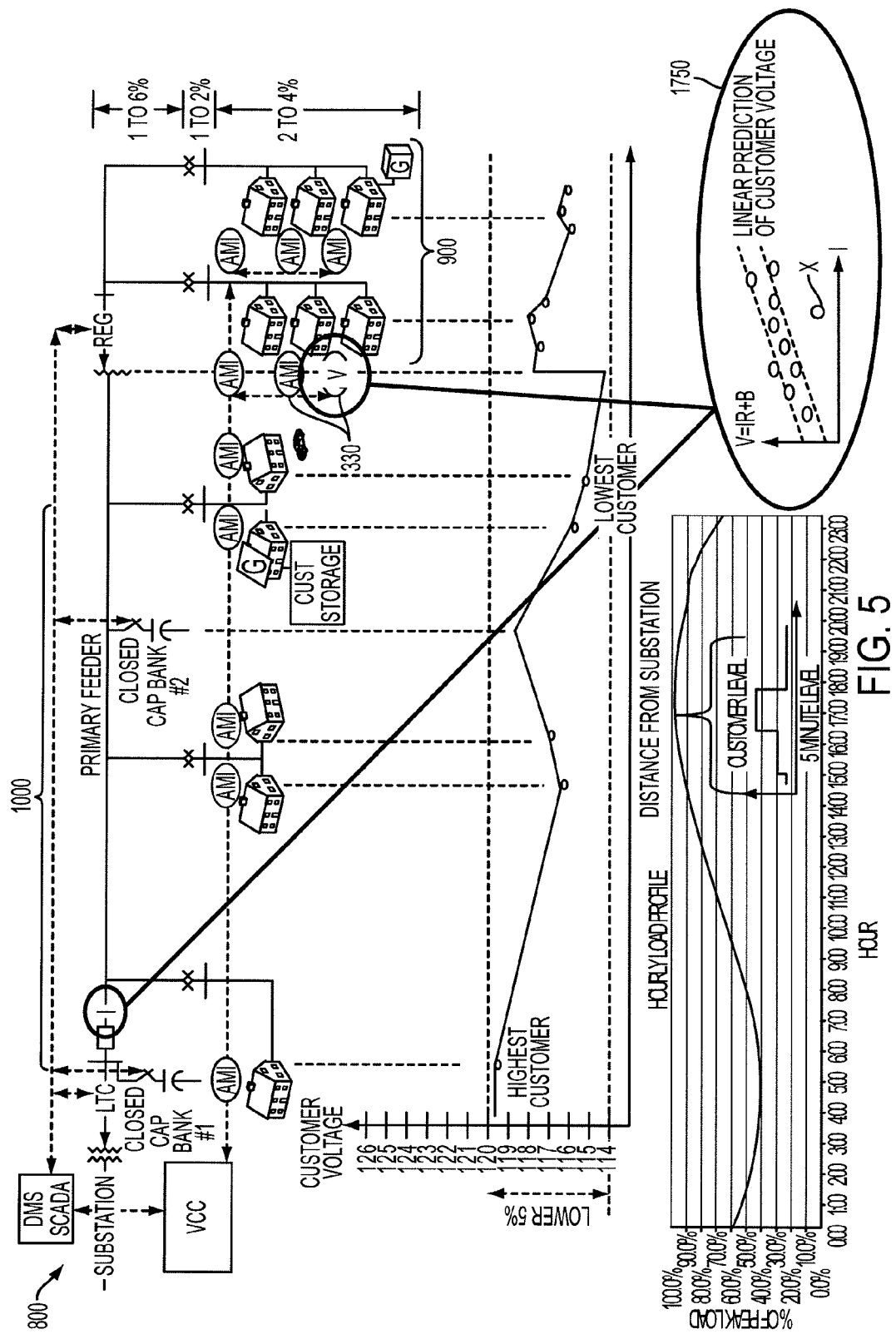
FIG. 5 shows a distribution system example of how the ESS data is correlated with the EUS data using linear regression to build the simple linear model of the voltage behavior of a EEDCS and customer loads, according to principles of the disclosure.

The chart 1750 in FIG. 5 shows how the voltage data from the ESS 800 is related to the AMI-measured voltage data of each EUS 900. The linearization technique (described with respect to FIGS. 7-10) used to create the chart 1750 is an important aspect of the disclosed embodiments. The ability of the EPP system 1700 to use a simple linearization technique to relate the source (e.g., ESS) voltage and delivery (e.g., EUS) voltage, creates an efficient method to calculate the voltage ranges available based on variations of ESS and EUS load data forecast by the EEDS system 700 owners. This method also enables the application of a novel linear optimization process that can quickly evaluate various changes to the EEDCS 1000 and document the resulting change in voltage range capability.

Figure 6:
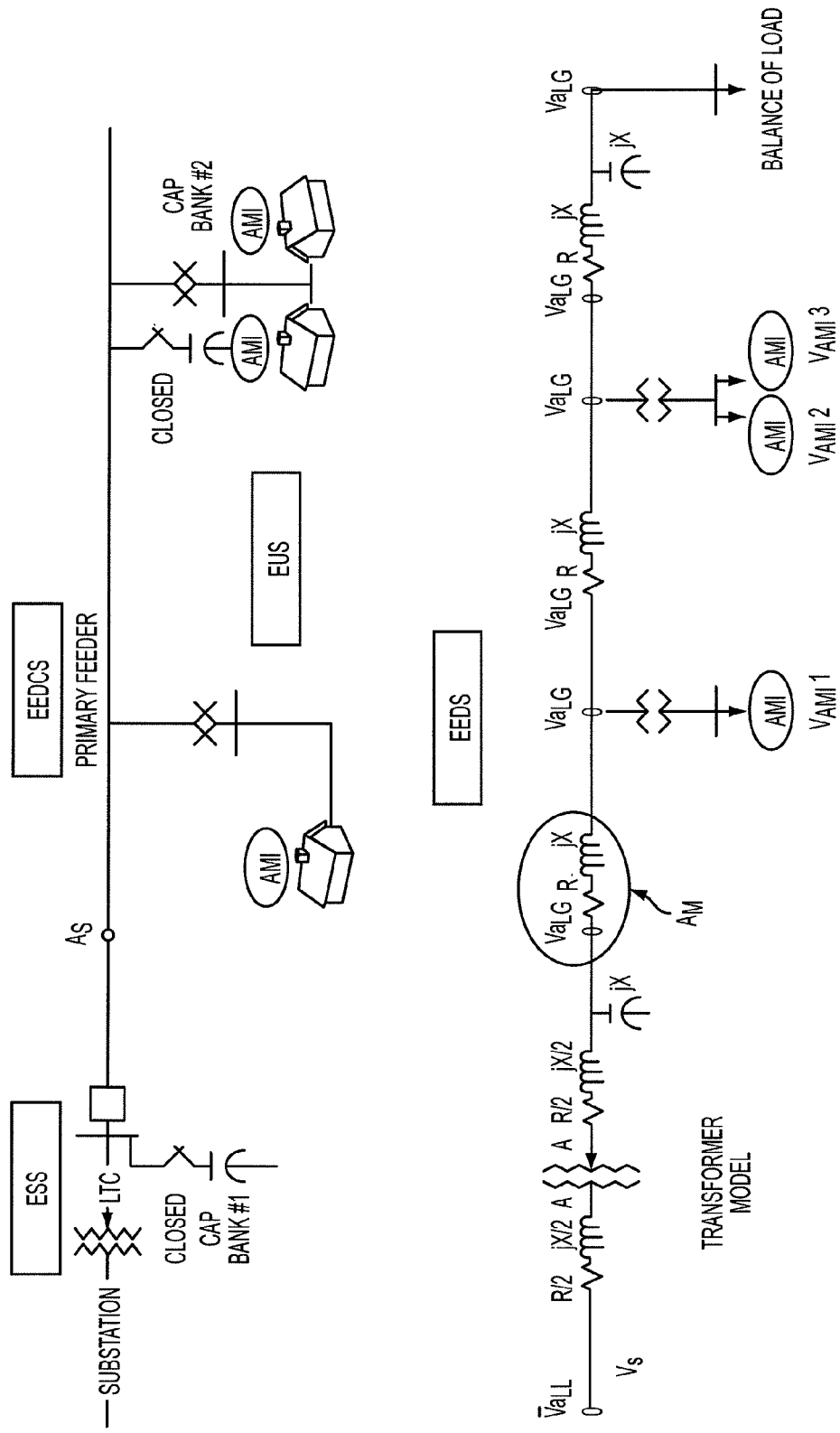
FIG. 6 shows a distribution system example of how the primary system is modeled to determine the change in linear system characteristics that are developed for specific modifications to the connection equipment and voltage control equipment, according to principles of the disclosure.

FIG. 6 shows a method used to model the system to relate the simple linear model to the potential changes identified by the EPP system 1700. For each proposed system modification, the linear model is changed to represent the effect of the modification on the system. For example, if a proposed system modification is to add an additional capacitor to the transmission line at location $A_S$ of the system, this could be modeled by changing the appropriate variables at location $A_M$ of the model. With this new representation, the system is evaluated by the EPP system 1700 to determine if the proposed modification results in additional voltage range. This additional voltage range can be used with the determined CVR factor capacity to calculate the energy savings and the demand savings based on the forecasted ESS loads to determine a combined energy improvement effect of the proposed system modification. The EPP system 1700 performs the evaluations over 24 hour intervals of one hour up to yearly intervals of 8760 hour intervals. This gives the ability to optimize the number and priority of the modification projects and search the solutions for the optimum combination of the modifications to the EEDS 700.

FIGS. 7-10 show a linearization example for one ESS 800 and EUS 900 element in an actual system. As can be seen in FIG. 7 the $ESS_{DATA}$ is the AMI data from the ESS 800 and the $EUS_{DATA}$ is the AMI data from the EUS. This data ($ESS_{DATA}$ and $EUS_{DATA}$) is used to perform the evaluation. Specifically, $ESS_{DATA}$ can be used, as is known to one of skill in the art, to determine the value of $ESS_{Current}$ and DeltaV is $V_S-V_{AMI}$. Using the equation shown in FIG. 5 (V=IR+B, where V is DeltaV, I is $ESS_{Current}$), a linear regression calculation can solve for the slope (R) and the intercept (B) of the best line fit to the data (see, FIG. 10). In this example, the linear regression equation for the data is $V_S-V_{AMI}=12.9(ESS_{current})-1.17$.

Figure 9:
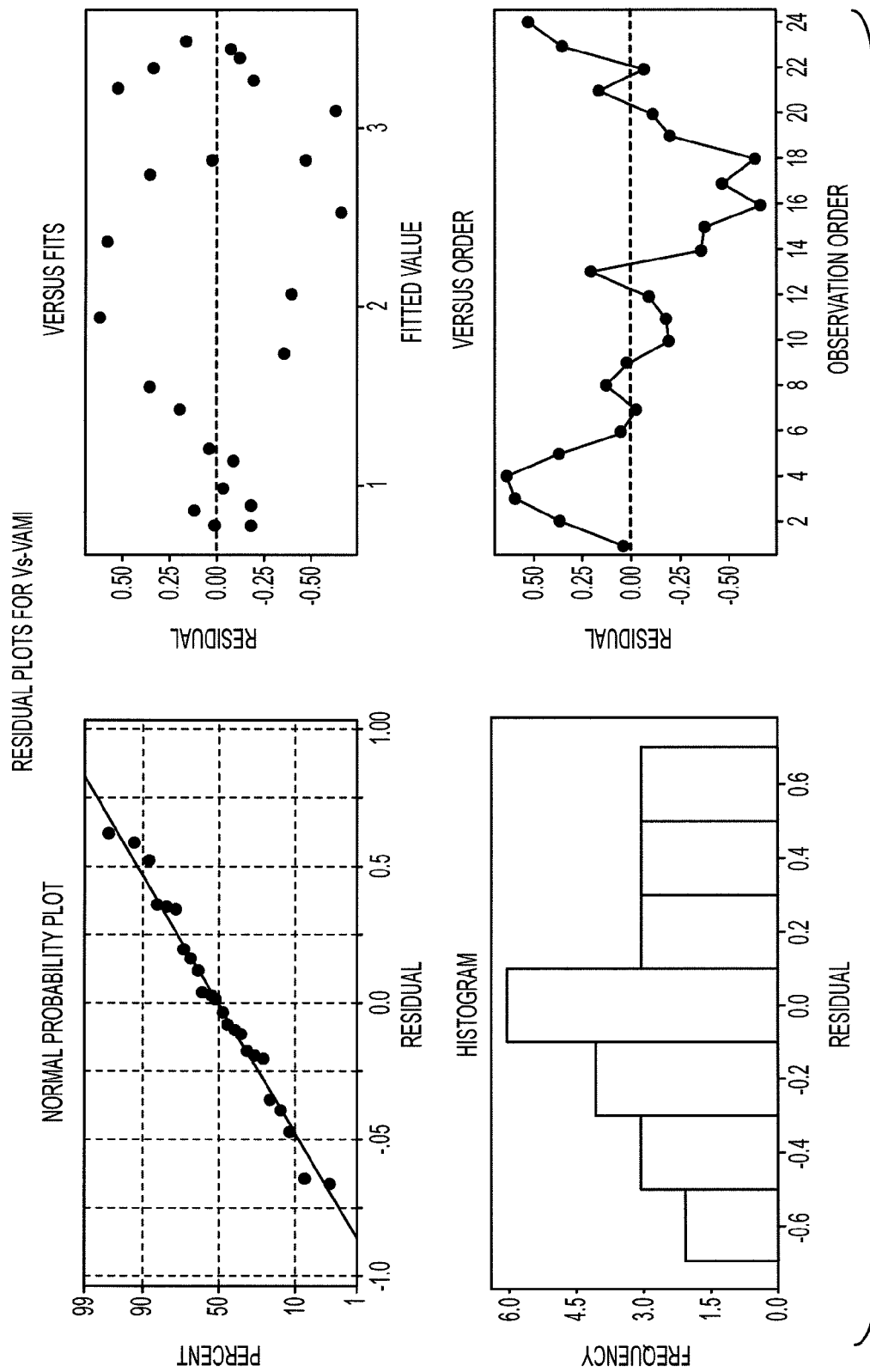
FIG. 9 shows an example of the results of the linear regression analysis histograms of the example data from FIG. 7, according to the principles of the disclosure.
Figure 10:
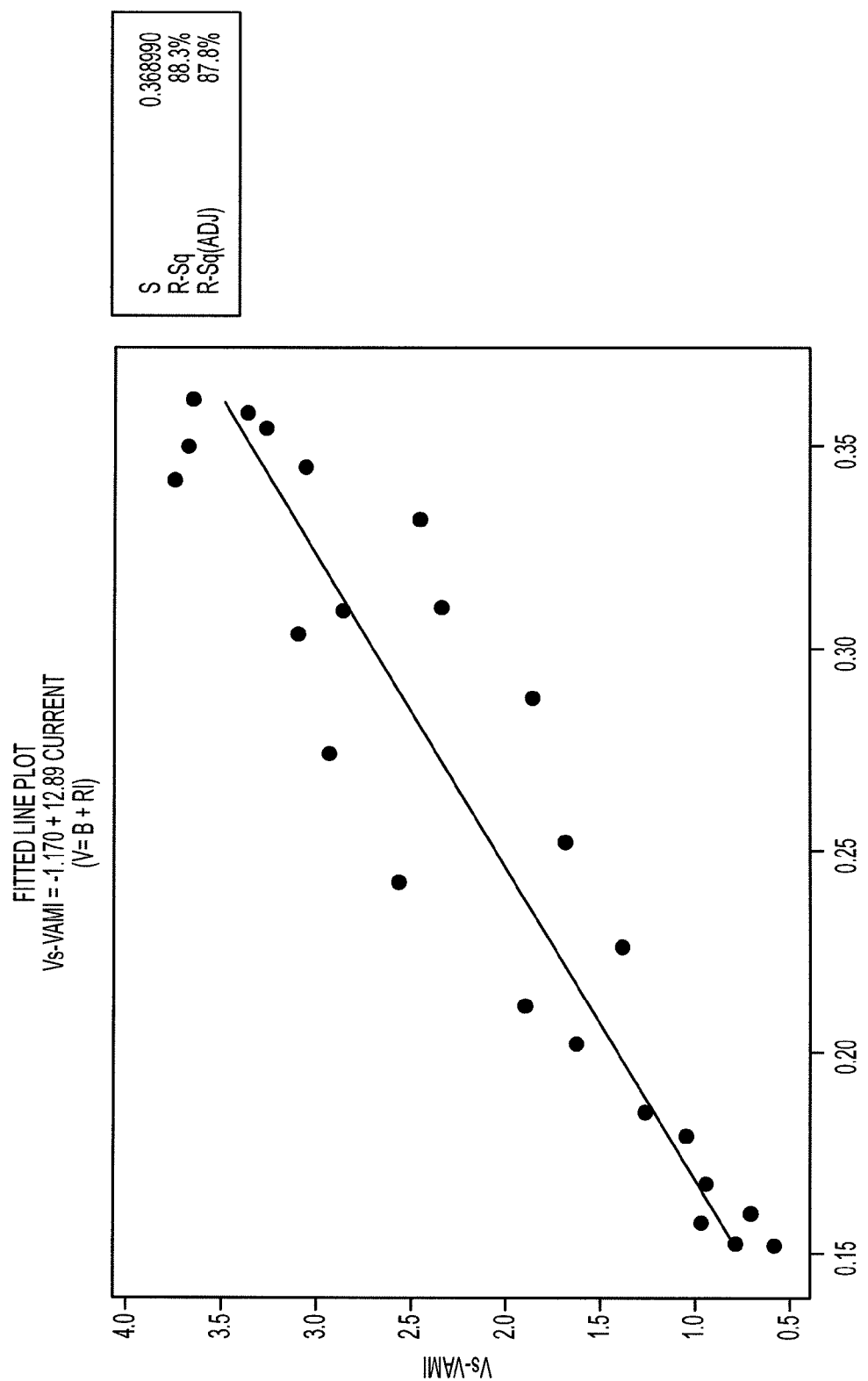
FIG. 10 shows an example of the results of the linear regression analysis histograms of the example data from FIG. 7, according to the principles of the disclosure

FIG. 8 shows that 88 to 89% of the variation in voltage drop from ESS to EUS can be explained by the linear technique (e.g., the $R^2$ value is 88.3%, which describe how well the regression line fits the set of data). In addition, the remaining residual represents the normalized variation at the EUS that is characteristic of the "ON" and "OFF" nature of the load switching occurring at the EUS. This characterization of the EUS is critical to an efficient method of planning the distribution secondary voltage performance and tracking its reliability. FIGS. 9 and 10 show the calculations for how well the model represents the 24 hour performance of the EUS. This is consistent to within one half volt and the residuals are highly normalized. This gives a great view into characterizing "normal" EUS behavior as well as measuring abnormal EUS behavior. The system is an excellent model to be implemented in the EPP system 1700.

Figure 11:
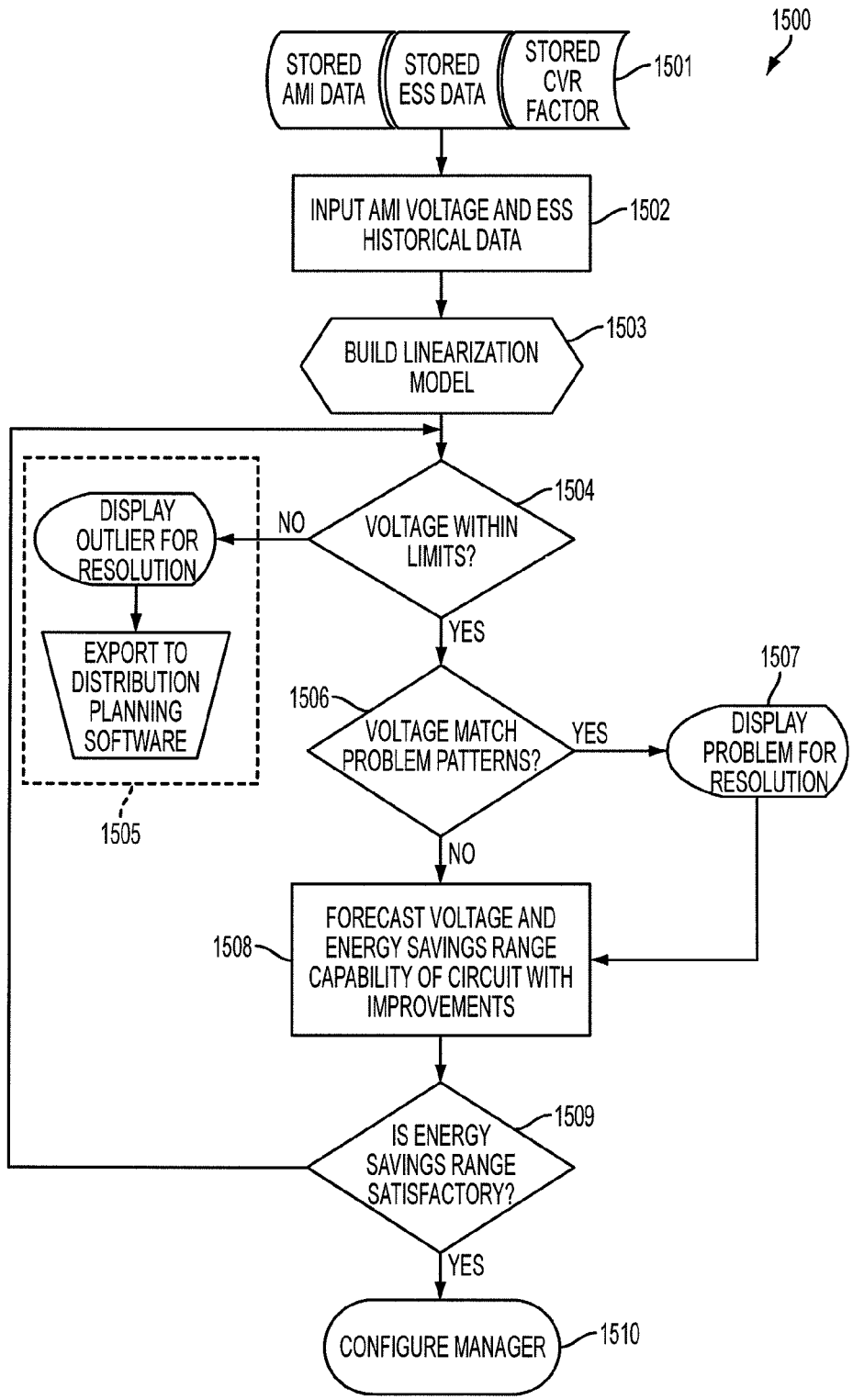
FIG. 11 shows an example of an Energy Planning Process (EPP) map of the planning process for controlling voltage, according to the principles of the disclosure.

FIG. 11 is a flow diagram showing the energy planning process 1500 (e.g., a voltage planning process) implemented by the EPP system 1700. The process starts with reading three major blocks of data at step 1501: AMI data, ESS data, and CVR factor data. As indicated previously, the AMI data is measured voltage data from EUS 900, the ESS data is measured voltage data from ESS 800 and the CVR factor is calculated by EVP 600. Then historical AMI data and historical ESS data are input, for example, from database 470 at step 1502.

The linearization model, as discussed above with respect to FIGS. 7-10, is built at step 1503. At step 1504, the data read-in by the process and the forecast of energy use at the ESS are used to determine the range of voltage operation and identify the normal outliers (e.g., voltages not within limits). If any voltages are outside of normal limits, these are resolved by the traditional planning process (e.g., traditional field resolution methods) at step 1505.

The next step 1506 is to identify any patterns of voltages denoting specific problems impacting voltage reliability, in accordance with this disclosure. Examples of problems which create recognizable patterns in the linearization process comparison include a poor connection between a meter and a meter base, an overloaded secondary conductor, an overloaded secondary transformer, an incorrect transformer tap setting, an incompatible type of meter connected in a meter base, and a bad neutral connection. These can be identified, for example, as a data point lying outside of the linear regression (see e.g., point X on chart 1750 of FIG. 5). Once the problems are identified, they are put into the project process to resolve first at step 1507. Once resolved, the corrected linearization model is used to calculate the new range of performance using the CVR factor, at step 1508. If the determined savings is satisfactory for the next operating period (step 1509), the process moves to the next step 1510. If not the linearization model is run again with tighter tolerances (e.g. returns to step 1504) and the process is repeated until the targeted energy improvement is derived.

The final step 1510 is to choose a new set of initial meters for monitoring and/or to configure the VCC 200 to operate with the new level of system performance forecasted by the EPP 1700. This information is then supplied to the VCC 200 and the EVP 600 to configure the controls over the next operating period.

Figure 12:
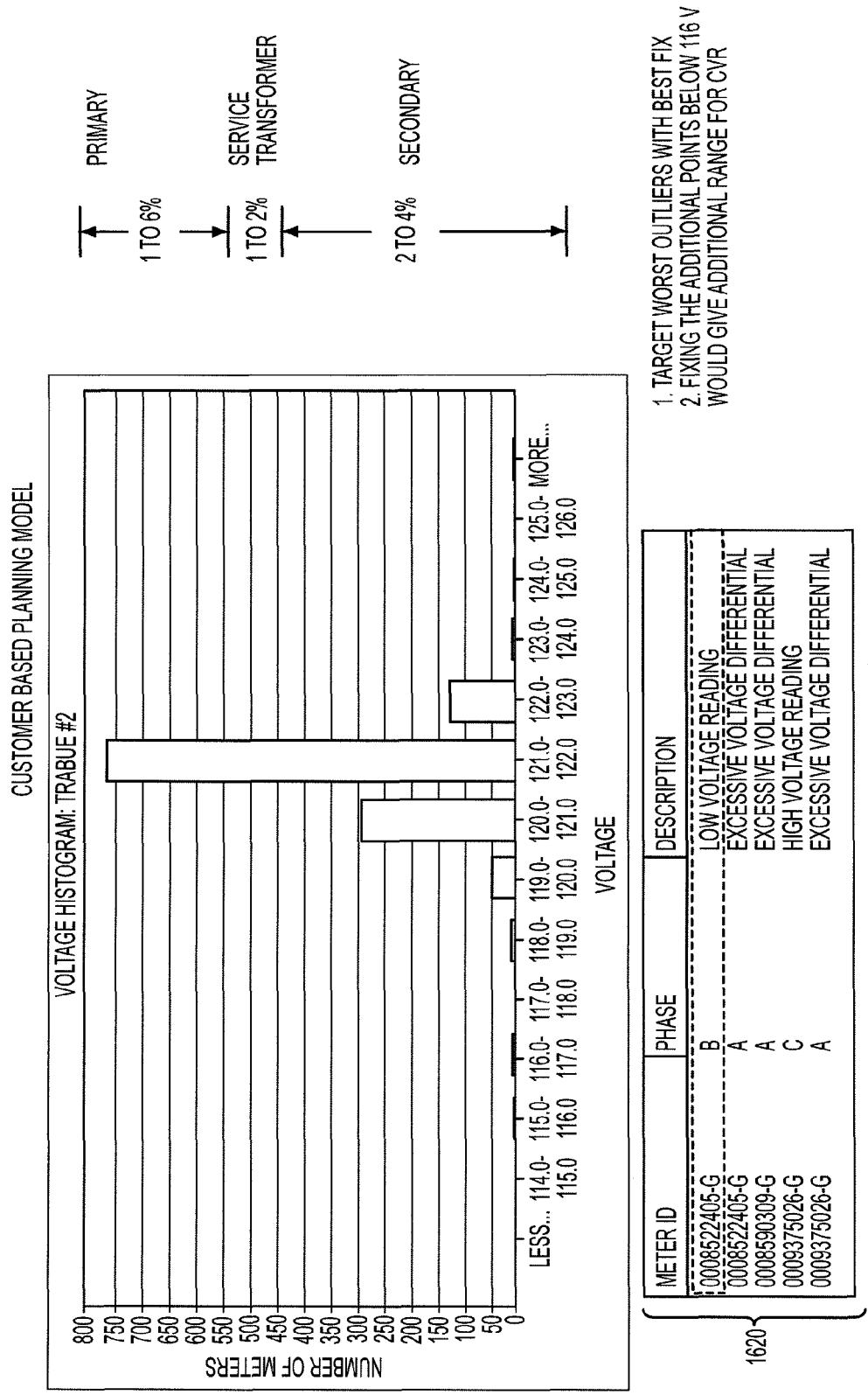
FIG. 12 shows an example of a histogram of the EUS AMI voltage data used to identify the voltage outliers for developing modification plans for the EEDS, according to principles of the disclosure.
Figure 13:
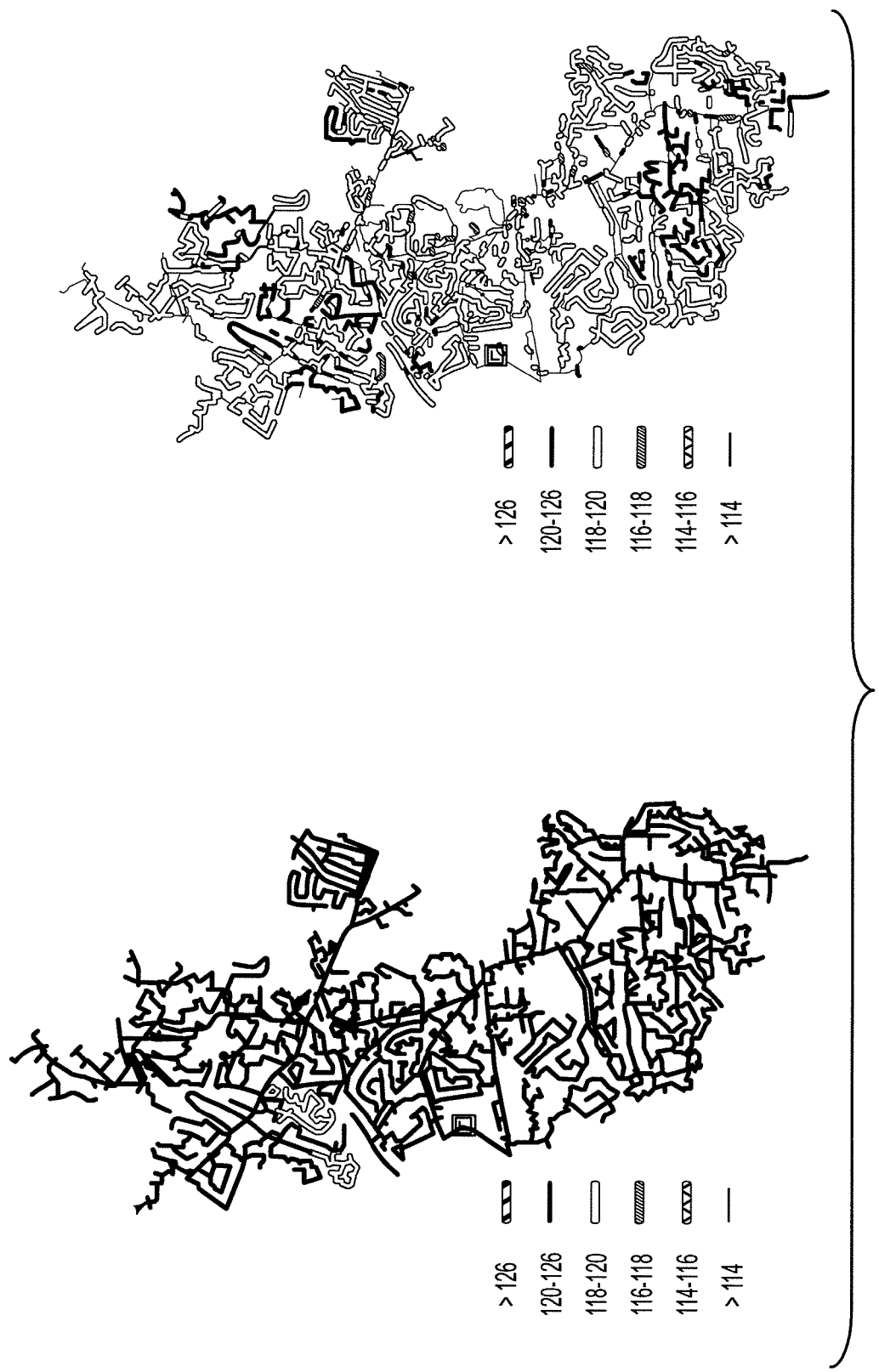
FIG. 13 shows a distribution circuit example of an application that maps the EUS AMI data to a circuit one line diagram for use by the planners to develop circuit modifications with their existing circuit planning software, according to principles of the disclosure.

FIG. 12 shows an example of the display for the outlier identification (see, chart 1620) and some potential problems that may be identified from this step in the process. FIG. 13 shows the display screen that transfers the AMI data analysis to a geographic one line chart that can be used by the planner to determine the best combination of modifications at the secondary level or EUS level without having to do a detailed secondary model. The information can also be combined with various GIS representations to give the planning key information for selecting the best group of circuit modifications to optimize the performance of the voltage.

Figure 14:
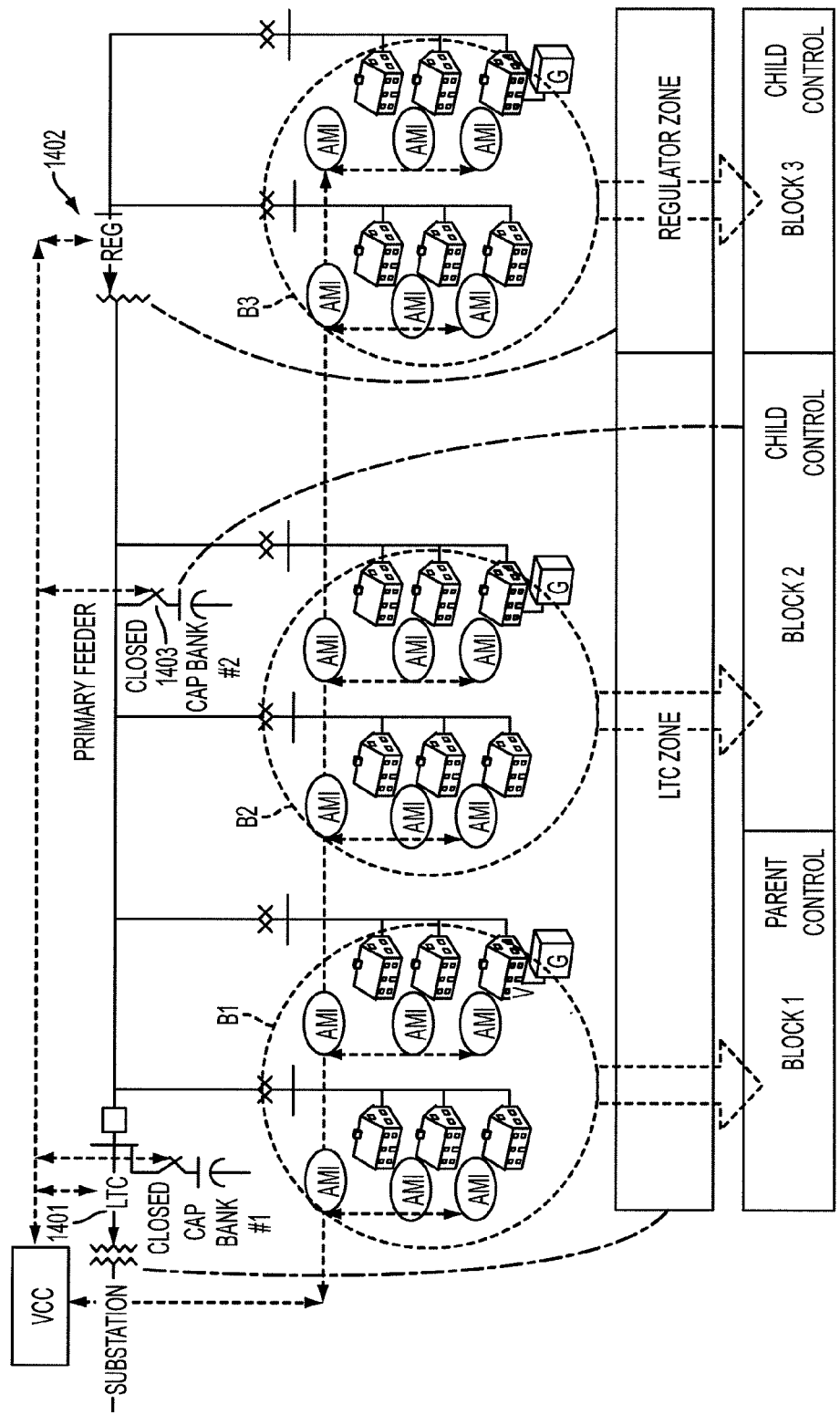
FIG. 14 shows a distribution circuit example of a mapping of the AMI voltage points to specific zones and blocks to match up with specific control devices on the EEDS, according to principles of the disclosure.

FIG. 14 illustrates the final step in the EPP process 1700, where the new meter information and the modifications are translated into the control information used by the EPP system 1700 by identifying which meters are associated with each block and zone of the control. Each "zone" refers to all AMIs 330 downstream of a regulator and upstream of the next regulator (e.g., LTC, regulator) and each "block" refers to areas within the sphere of influence of features of the distribution system (e.g., a specific capacitor). In the example shown in FIG. 14, the LTC Zone includes all AMIs 330 downstream of the LTC and upstream of regulator 1402 (e.g., the AMIs 330 in B1 and B2), the Regulator Zone includes all AMIs 330 downstream of regulator 1402 (e.g., the AMIs 300 in B3), and Block 2 (B2) includes all AMIs 330 within the influence (upstream or downstream) of capacitor 1403. This new meter and modification information, along with detailed configuration information (zone/block information), is provided by the EPP system 1700 to the VCC 200 to allow clear implementation of the control with the new modifications in place.

FIG. 15 shows an example of the final file for configuring the initial set of meters for monitoring in CVR, using the EPP system 1700. The recommended set is given by the EPP system 1700. However, the user may be allowed to change this recommended set if additional considerations, such as critical customers or other criteria, override the automatic selection process inside the EPP system 1700. This final configuration is then transferred directly to the VCC configuration file for implementation.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed as new and desired to be protected by Letters Patent of the United States is:

1. A voltage control and energy conservation system planning technique using linear regression to select the best modifications in an EEDS system to optimize voltage conservation and to provide improved voltage reliability for the following:
    an electrical energy delivery system with a substation configured as an electrical supply system supplying power through an electrical distribution system to an electrical usage system for use by electrical usage devices at a plurality of user locations;
    a meter located at the substation and at least one of the plurality of user locations and configured to generate AMI data based on a measured component of electrical power received by the meter; and
    a voltage controller configured to generate an energy delivery parameter based on the AMI data,
    wherein the substation is further configured to adjust a voltage set point value of the electrical power supplied to the plurality of user locations based on the energy delivery parameter, and
    wherein the voltage and energy are measured on an interval basis using an energy validation process, and a change in energy characteristic, including a conservation voltage reduction (CVR) factor, and an energy savings between the voltage at the CVR "ON" set point and the CVR "OFF" set point are measured using a paired t measurement using an optimized pairing process to determine the CVR factor and an energy usage modification for the electrical energy delivery system.

2. The system of claim 1, wherein the planning process comprises:
    an additional process that identifies abnormal operation of voltage using a linear regression technique that compares the operating linear regression pattern against patterns identified in a database relating to system reliability issues.

3. The system of claim 1 where the method of identifying modifications to the system uses a linearized optimization based on the representation of distribution system losses and the conservation voltage reduction losses as the performance criterion.

4. The system of claim 1 where the linearization is used to compare voltages to correlate using the linearization technique the phase location and circuit location using AMI voltages.

5. A voltage control and energy conservation system using linear regression to select modifications in an EEDS system to optimize voltage conservation and to provide improved voltage reliability, comprising:
    an electrical energy delivery system with a substation configured as an electrical supply system supplying power through an electrical distribution system to an electrical usage system for use by electrical usage devices at a plurality of user locations;
    a plurality of meters, including a meter located at a supply point at the substation, and at least one meter located at a respective at least one of the plurality of user locations and configured to generate meter data based on a measured component of electrical power received by the at least one meter located at a respective at least one of the plurality of user locations;
    a voltage controller configured to operate in a conservation-voltage-reduction-on state or in a conservation-voltage-reduction-off state; wherein the voltage controller applies conservation voltage reduction to generate a conservation voltage reduction energy delivery parameter based on the meter data when the controller is in the conservation-voltage-reduction-on state, but not when the controller is in the conservation-voltage-reduction-off state;
    wherein the substation is further configured to adjust a voltage set point value of the electrical power supplied at the supply point to the plurality of user locations based on the energy delivery parameter;
    wherein the voltage and energy are measured by the meters on an interval basis using an energy validation process, the change in energy characteristics between the voltage conservation-voltage-reduction-on state and the conservation-voltage-reduction-off state being determined using a paired t measurement; and
    wherein the voltage controller is further configured to identify modifications to the system using a linearized optimization based on the representation of distribution system losses and the conservation voltage reduction losses as the performance criterion.

6. A voltage control and energy conservation system using linear regression to select modifications in an EEDS system to optimize voltage conservation and to provide improved voltage reliability, comprising:
    an electrical energy delivery system with a substation configured as an electrical supply system supplying power through an electrical distribution system to an electrical usage system for use by electrical usage devices at a plurality of user locations;
    a plurality of meters, including a meter located at a supply point at the substation, and at least one meter located at a respective at least one of the plurality of user locations and configured to generate meter data based on a measured component of electrical power received by the at least one meter located at a respective at least one of the plurality of user locations;
    a voltage controller configured to operate in a conservation-voltage-reduction-on state or in a conservation-voltage-reduction-off state; wherein the voltage controller applies conservation voltage reduction to generate a conservation voltage reduction energy delivery parameter based on the meter data when the controller is in the conservation-voltage-reduction-on state, but not when the controller is in the conservation-voltage-reduction-off state;

wherein the substation is further configured to adjust a voltage set point value of the electrical power supplied at the supply point to the plurality of user locations based on the energy delivery parameter;

wherein the voltage and energy are measured by the meters on an interval basis using an energy validation process, the change in energy characteristics between the voltage conservation-voltage-reduction-on state and the conservation-voltage-reduction-off state being determined using a paired t measurement; and wherein voltage controller is further configured to identify abnormal operation of voltage using a linear regression technique that compares the operating linear regression pattern against patterns identified in a database relating to system reliability.

7. The system of claim 6, wherein the substation is further configured to adjust a voltage set point value of the electrical power supplied at the supply point to the plurality of user locations based on the change in energy characteristics.

8. The system of claim 6, wherein the voltage controller further configured to adjust the energy delivery parameter based on the change in energy characteristics.

9. The system of claim 6, wherein the energy characteristic is the conservation voltage reduction factor.

10. The system of claim 6, wherein the energy characteristic is the energy savings.

11. The system of claim 6, wherein each meter's data is averaged over the interval.

12. The system of claim 6, wherein the wherein the interval is a period of twenty-four hours.

13. The system of claim 6, wherein the interval is a period of four hours.

14. The system of claim 6, wherein the interval is a period of one hour.

15. The system of claim 6, wherein the pairing process comprises an additional process that breaks the paired t process into measurements of conservation voltage reduction factor and conservation energy savings by season and uses linear regression constants to determine the blocks of hours where consistent loads exist and paired t comparisons can be calculated accurately, within predetermined limits.

16. The system of claim 6, wherein the abnormal operation includes a poor connection between a meter and a meter base, an overloaded secondary conductor, an overloaded secondary transformer, an incorrect transformer tap setting, an incompatible type of meter connected in a meter base, or a bad neutral connection.

17. A control system for an electric power transmission and distribution grid configured to supply electric power from a supply point to a plurality of user locations, the system comprising:
a plurality of sensors, wherein each sensor is located at a respective one of a plurality of distribution locations on the distribution grid at or between the supply point and at least one of the plurality of user locations, and wherein each sensor is configured to sense a component of the supplied electric power at the respective distribution location and to generate measurement data based on the sensed component of the power;
a controller configured to generate an energy delivery parameter based on the measurement data received from the plurality of sensors, and to operate the electric power transmission and distribution grid in a modification-on state or in a modification-off state;
a component adjusting device configured to adjust a component of the electric power transmission and distribution grid in response to the energy delivery parameter;
wherein the component of the supplied electric power is measured by the sensors on an interval basis using an energy validation process, the change in energy characteristics between the modification-on state and the modification-off state being determined using a linear regression; and
wherein the controller is further configured to identify modifications to the system using a linearized optimization based on the representation of the energy characteristics.

18. The system of claim 17, wherein the controller is configured to apply the modification to generate an energy delivery parameter based on the measurement data when the controller is in the modification-on state, but not when the controller is in the modification-off state.

19. The system of claim 17, wherein the controller is configured to determine the change in an energy characteristic between the modification-on state and the modification-off state, and to identify modifications to the system based on the representation of the energy characteristic and the limiting voltage conditions determining the boundaries of optimized voltage operation.

20. The system of claim 19, wherein the modification is conservation voltage reduction, and the change in an energy characteristic is the conservation voltage reduction factor or the energy savings.

21. The system of claim 19, wherein the representation of the energy characteristic is the distribution system losses, the conservation voltage reduction losses, or the energy savings.

22. A control system for an electric power transmission and distribution grid configured to supply electric power from a supply point to a plurality of user locations, the system comprising:
a plurality of sensors, wherein each sensor is located at a respective one of a plurality of distribution locations on the distribution grid at or between the supply point and at least one of the plurality of user locations, and wherein each sensor is configured to sense a component of the supplied electric power at the respective distribution location and to generate measurement data based on the sensed component of the power;
a controller configured to receive measurement data from the plurality of sensors, and to identify abnormal operation of voltage using a technique that compares the voltage measurement data against patterns identified in a database relating to system reliability.

23. The system of claim 22, wherein the abnormal operation includes a poor connection between a meter and a meter base, an overloaded secondary conductor, an overloaded secondary transformer, an incorrect transformer tap setting, an incompatible type of meter connected in a meter base, or a bad neutral connection.

24. The system of claim 17, wherein the energy characteristic is distribution system losses and the conservation voltage reduction losses as the performance criterion.

25. The system of claim 17, wherein the component of the supplied electric power is voltage.

26. The system of claim 17, wherein the component of the electric power transmission and distribution grid adjusting device comprises: a load tap change transformer that adjusts the voltage of the electric power supplied at the supply point based on a load tap change coefficient; or a voltage regulator that adjusts the voltage of the electric power supplied at the supply point or at another point on the distribution grid based on the energy delivery parameter; or a capacitor regulator that adjusts the voltage of the electric power supplied at a point on the distribution grid based on the energy delivery parameter.

27. The system of claim 17, wherein the controller is configured to use a linear regression technique that compares an operating linear regression pattern against patterns identified in a database relating to normal energy characteristics, normal voltage characteristics, and normal impedance characteristics to forecast and modify energy delivery and system reliability.

28. The system of claim 17, wherein the controller is configured to use a multisource ESS combined into a linear model.

29. The system of claim 28, wherein the multisource ESS is plurality of transformers treated as a single transformer for the model.

30. The system of claim 17 wherein the controller is configured to use linearization, GIS coordinates, and meter voltage correlation to determine the proximity of the meters to the adjusting device.

31. A method for controlling electrical power supplied to a plurality of distribution locations located at or between a supply point and at least one user location, each of the plurality of distribution locations including at least one sensor configured to sense a voltage of the supplied electric power at the respective distribution location and generate measurement data based on the sensed voltage, the method comprising:
controlling the electric power transmission and distribution grid in a modification-on state or in a modification-off state; wherein a controller applies the modification to generate an energy delivery parameter based on the measurement data when the controller is in the modification-on state, but not when the controller is in the modification-off state;
operating an component adjusting device configured to adjust a component of the electric power transmission and distribution grid in response to the energy delivery parameter;
measuring the component of the supplied electric power with the meters on an interval basis using an energy validation process, and determining the change in energy characteristics between the voltage conservation-voltage-reduction-on state and the conservation-voltage-reduction-off using a linear regression; and
operating the controller to identify modifications to the system using a linearized optimization based on the representation the energy characteristics.

32. A method for controlling electrical power supplied to a plurality of distribution locations located at or between a supply point and at least one user location, each of the plurality of distribution locations including at least one sensor configured to sense a voltage of the supplied electric power at the respective distribution location and generate measurement data based on the sensed voltage, the method comprising:
controlling the electric power transmission and distribution grid in a modification-on state or in a modification-off state; wherein a controller applies the modification to generate an energy delivery parameter based on the measurement data when the controller is in the modification-on state, but not when the controller is in the modification-off state;
operating a component adjusting device configured to adjust a component of the electric power transmission and distribution grid in response to the energy delivery parameter;
measuring the component of the supplied electric power with the meters on an interval basis using an energy validation process, and determining the change in energy characteristics between the voltage conservation-voltage-reduction-on state and the conservation-voltage-reduction-off using a linear regression; and
operating the controller to identify abnormal operation of voltage using a linear regression technique that compares the operating linear regression pattern against patterns identified in a database relating to system reliability.

33. The method of claim 31, wherein the component of the supplied electric power is voltage.

34. The method of claim 31, wherein the modification is conservation voltage reduction.

35. The method of claim 31, wherein the component of the electric power transmission and distribution grid adjusting device comprises: a load tap change transformer that adjusts the voltage of the electric power supplied at the supply point based on a load tap change coefficient; or a voltage regulator that adjusts the voltage of the electric power supplied at the supply point or at another point on the distribution grid based on the energy delivery parameter; or a capacitor that adjusts the voltage of the electric power supplied at a point on the distribution grid based on the energy delivery parameter.

36. The method of claim 32 wherein the energy characteristic is the conservation voltage reduction factor.

37. The method of claim 31, wherein the energy characteristic is the energy savings.

38. The method of claim 31, wherein each meter's data is averaged over the interval.

39. The method of claim 31, wherein the wherein the interval is a period of twenty-four hours.

40. The method of claim 31, wherein the interval is a period of four hours.

41. The method of claim 31, wherein the interval is a period of one hour.

42. The method of claim 31, wherein the abnormal operation includes a poor connection between a meter and a meter base, an overloaded secondary conductor, an overloaded secondary transformer, an incorrect transformer tap setting, an incompatible type of meter connected in a meter base, or a bad neutral connection.

* * * * *